United States Patent
Barnett et al.

(10) Patent No.: US 11,201,670 B2
(45) Date of Patent: Dec. 14, 2021

(54) VISIBLE LIGHT COMMUNICATION

(71) Applicant: Comcast Cable Communications, LLC, Philadelphia, PA (US)

(72) Inventors: Glenn Barnett, Aurora, CO (US); Manohar Reddy Paduri, Highlands Ranch, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 16/377,085

(22) Filed: Apr. 5, 2019

(65) Prior Publication Data
US 2020/0322047 A1   Oct. 8, 2020

(51) Int. Cl.
*H04B 10/00* (2013.01)
*H04B 10/116* (2013.01)
*H04B 10/114* (2013.01)
*H04J 14/00* (2006.01)

(52) U.S. Cl.
CPC ....... *H04B 10/116* (2013.01); *H04B 10/1143* (2013.01); *H04B 10/1149* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| | | |
|---|---|---|
| 9,198,262 B1 | 11/2015 | Bosua et al. |
| 2007/0058987 A1 | 3/2007 | Suzuki |
| 2011/0069962 A1* | 3/2011 | Castor ............... H04B 10/1149 398/115 |
| 2012/0155889 A1 | 6/2012 | Kim et al. |
| 2014/0205136 A1 | 7/2014 | Oshima et al. |
| 2019/0020744 A1* | 1/2019 | Dong ................. H04B 10/1149 |
| 2019/0356386 A1* | 11/2019 | Kim ..................... H05B 47/165 |
| 2020/0359085 A1* | 11/2020 | Tsutsui ................ H04B 10/116 |

OTHER PUBLICATIONS

M.Thanigavel, "Li-Fi Technology in Wireless Communication", International Journal of Engineering Research & Technology (IJERT), vol. 2 Issue 10, Oct. 2013 (7 pages).

* cited by examiner

*Primary Examiner* — Daniel G Dobson
(74) *Attorney, Agent, or Firm* — Ballard Spahr LLP

(57) ABSTRACT

Methods, systems, and apparatuses for light-based communication are described. VLC may be used to communicate video content, an electronic program guide (EPG), location information, an advertisement, and/or any other data, content, and/or content item to a user device. VLC may be used to communicate data/information associated with a wireless network, provision a service, navigate an area, track content and/or content item consumption, and more. Light (e.g., VLC, etc.) may be used to communicate any information/data.

24 Claims, 15 Drawing Sheets

1310
DETERMINE LOCATION INFORMATION FOR EACH DISPLAY DEVICE OF A PLURALITY OF DISPLAY DEVICES

1320
EMBED RESPECTIVE LOCATION INFORMATION INTO A RESPECTIVE DATA STREAM ADDRESSED TO EACH DISPLAY DEVICE

┌─ 1410
DETERMINE TRACKING DATA FOR EACH CONTENT ITEM OF A PLURALITY OF CONTENT ITEMS

↓

┌─ 1420
EMBED THE TRACKING DATA AS VISIBLE LIGHT COMMUNICATION (VLC) DATA INTO A DATA STREAM

↓

┌─ 1430
RECEIVE AN INDICATION OF THE TRACKING DATA AND AN IDENTIFIER

↓

┌─ 1440
DETERMINE, BASED ON INDICATION OF THE TRACKING DATA AND THE IDENTIFIER, CONTENT CONSUMPTION DATA

VISIBLE LIGHT COMMUNICATION

BACKGROUND

Wireless communicating devices have become more pervasive. Information exchange (e.g., content, movies, directions, advertisements, smart service related data, etc.) between devices is required to provide both standard and unique user experiences, such as content and/or content item consumption, mapping services, commercial advertisement, and/or the like. Typical wireless networks use radio waves to carry information between devices in a network. Wireless networks, such as a home or office Wi-Fi, are routinely overloaded and may require costly additional equipment to support communications between devices. There is a need for alternate means of communications to support the ubiquitous nature of wireless communicating devices.

SUMMARY

It is to be understood that both the following general description and the following detailed description are exemplary and explanatory only and are not restrictive. Methods, systems, and apparatuses for visible light communication are described. Light may be used to communicate data/information. A computing device (e.g., a set-top box, a communication terminal, etc.) may provide content and/or visible light communication (VLC) data to a display device (e.g., a light emitting diode (LED) display device, a television, a monitor, etc.). The content may be video content provided by a content provider. The display device may display/provide the content to a user while also providing/sending VLC data to a user device (e.g., a smart device, a mobile device, network device, etc.). To provide/send VLC data to the user device, a light emitting component(s) of the display device may alternate an intensity of light output to indicate binary data. A higher light intensity may indicate a 1, and a lower light intensity may indicate a 0. The LED(s) may alternate the intensity of light at a frequency that is imperceptible to the human eye. The user device may receive/detect the alternations in light intensity to determine the VLC data. The VLC data may be used to register/authenticate the user device to a network, offload data/information facilitated by Wi-Fi to expand a wireless network, determine a location and/or orientation of the user device, and more.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 13 shows a flowchart of a method for VLC communication;

FIG. 14 shows a flowchart of a method for VLC communication; and

DETAILED DESCRIPTION

Figure 1:
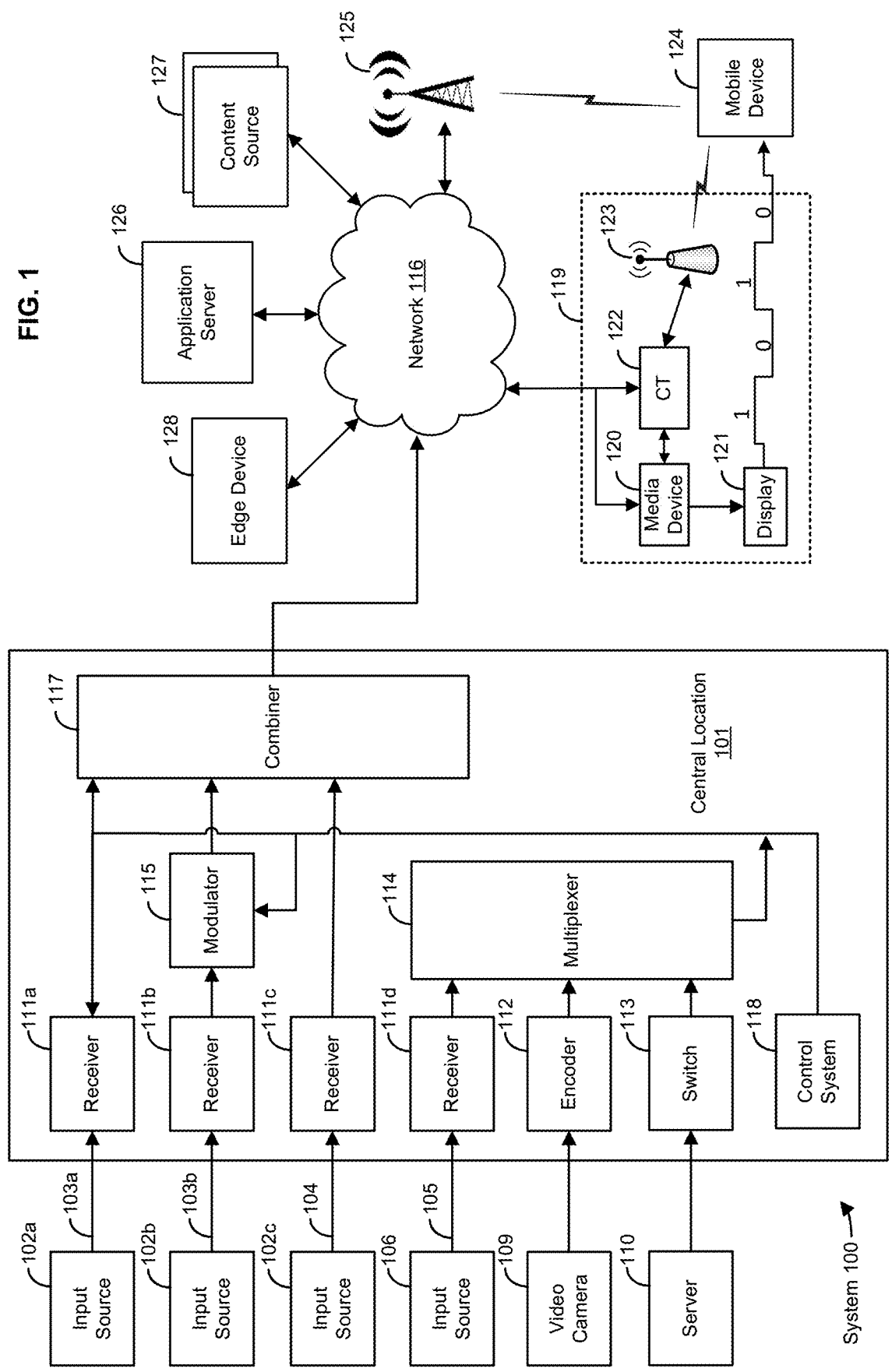
FIG. 1 shows an example system for VLC communication.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Content items (which may also be referred to as "content," "content data," "content information," "content asset," "multimedia asset data file," or simply "data" or "information") may be any information or data that may be licensed to one or more individuals (or other entities, such as business or group). Content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future. The content items described herein may include electronic representations of music, spoken words, or other audio, which may include but is not limited to data files adhering to the MPEG-1 Audio Layer 3 (MP3) format, Adobe®, CableLabs 1.0, 1.1, 3.0, AVC, HEVC, H.264, Nielsen watermarks, V-chip data and Secondary Audio Programs (SAP), Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may include any combination of the above-described examples.

Consuming content or the consumption of content, which may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Visible Light Communication (VLC), such as Light Fidelity (Li-Fi), is described for improving wireless networks. Similar to infrared communications, VLC is an optical wireless communication technology that utilizes wavelengths of light that are imperceptible to the human eye. A light emitting object/device (e.g., a display device, a light emitting diode (LED), a television, a monitor, etc.) may use VLC to send data, information, and/or the like. The light emitting object/device may send the data, the information, and/or the like automatically (e.g., without an instruction and/or request from another device, or based on an instruction and/or request from another device, such as computing device (e.g., set-top box, communication device, etc.). The light emitting object/device may send the data, the information, and/or the like periodically, incrementally, consistently, randomly, and/or the like. In some instances, the light emitting object/device and the other device (e.g., computing device, etc.) may be part of a single object/device.

The described systems, methods, and apparatuses may increase and/or improve the transfer/communication data/information (e.g., expand a wireless network, etc.) for devices within proximity of the display device. Devices within a line of sight of the display device may receive, via Li-Fi technology (and/or any related technology or communication technique), data/information that may originated from and/or be associated with a Wi-Fi network and/or technology (or any other wireless network, technology, and/or communication technique). VLC communication may be used to activate/provision an electronic device, such as a mobile phone, smartwatch, and/or Internet-of-Things (IoT) device. The described VLC system may be used to assist with navigation, such as navigating through an indoor facility and/or area. The described VLC system may be used to improve tracking of user interaction with ads and viewership of programs. Advertisement (e.g., commercial advertisement, information advertisement, etc.) viewership may be based on a user device (e.g., a smart device, a mobile device, network device, etc.) receiving data/information from the display device via Li-Fi facilitated by a visible light communication (VLC) technique. VLC data may include an identifier (identifying data/information), such as a watermark. The identifier may be associated with a displayed advertisement. The user device may receive the VLC data from the display device, and may communicate, verify, and/or send a notification via another wireless network (e.g., a cellular network, Wi-Fi network, satellite network, short-range communication network, etc.) that the user device received the VLC data. The communication, verification, and/or notification of the received VLC data may be sent to a content provider to confirm viewership of the advertisement.

FIG. 1 shows a system 100 for visible light communication (VLC). Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

The system 100 may include a central location 101 (e.g., a headend). The central location 101 may receive content (e.g., data, input programming, and the like) from multiple sources. The central location 101 may combine the content from the various sources and may distribute the content to user (e.g., subscriber) locations (e.g., location 119) via a network 116 (e.g., content distribution network, access system/network, etc.).

The central location 101 may receive content from a plurality of sources 102a, 102b, and 102c. The content may be sent from the plurality of sources to the central location 101 via a variety of transmission paths, including wireless (e.g., satellite paths 103a, 103b) and terrestrial path 104. The central location 101 may also receive content from a direct feed source 106 via a direct line 105. Other input sources may be capture devices such as a video camera 109 or a server 110. The signals provided by the content sources may include a single content item, a portion of a content item (e.g., content fragment, content portion, content section), a content stream, a multiplex that includes several content items, and/or the like.

The central location 101 may comprise one or a plurality of receivers 111a, 111b, 111c, 111d that are each associated with an input source. MPEG encoders such as encoder 112, are included for encoding local content or a video camera 109 feed. A switch 113 may provide access to the server 110. The server 110 may be a Pay-Per-View server, a data server, an internet router, a network system, a phone system, and/or the like. Some signals may require additional processing, such as signal multiplexing, prior to being modulated. Such multiplexing may be performed by multiplexer (mux) 114.

The central location 101 may comprise one or a plurality of modulators 115 for interfacing to a network 116. The modulators 115 may convert the received content into a modulated output signal suitable for transmission over the network 116. The output signals from the modulators 115 may be combined, using equipment such as a combiner 117, for input into the network 116.

The network 116 may be a content delivery network, a content access network, and/or the like. The network 116 may provide content from a variety of sources using a variety of network paths, protocols, devices, and/or the like. The content delivery network and/or content access network may be managed (e.g., deployed, serviced) by a content provider, a service provider, and/or the like.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users/user devices (e.g., a smart devices, a mobile devices, network devices, etc.) may be connected to the network 116 at one or more of locations. At the user location 119, a media device 120 may demodulate and/or decode, if needed, the signals for display on a display device 121 (e.g., a light emitting diode (LED) display device, a television, a monitor, etc.). The media device 120 may be and/or include a demodulator, a decoder, a frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network, Wi-Fi, network, etc.). The media device 120 may be a set-top box, a digital streaming device, a gaming device, a media storage device, a digital recording device, a computing device, a combination thereof, and/or the like. The media device 120 may have one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. For a cable network, the communication terminal 122 may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart hub, smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may include an application server 126. The application server 126 may provide services related to applications. The application server 126 may include an application store. The application store may allow users to purchase, download, install, upgrade, and/or otherwise manage applications. The application server 126 may allow users to download applications to a device, such as a mobile device 124, a communications terminal 122, a media device 120, a display device 121, and/or the like. The application server 126 may run one or more application services to provide data, handle requests, and/or otherwise facilitate operation of applications for the user.

The system 100 may include one or more content sources 127. The content source 127 may provide content (e.g., video, audio, games, applications, data) to the user. The content source 127 may provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may include an edge device 128. The edge device 128 may provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may package content for delivery to the user (e.g., in a specific format requested by a user device), provide the user a manifest file (e.g., or other index file describing portions of the content). The edge device 128 may provide streaming content (e.g., unicast, multicast). The edge device 128 may cache or otherwise store content (e.g., frequently requested content) to enable faster delivery of content to users. The edge device 128 may embed (e.g., encode, modify, process, etc.) content, such as content from the content source 127, the application server 126, and/or any other device/source, with visible light communication (VLC) data/information.

The edge device 128 may send/provide content embedded with VLC data/information to one or more devices (e.g., a user device, the media device 120, the display 121, the communication terminal 122, etc.). The edge device 128 may embed the content with an identifier that identifies the VLC and/or distinguishes the VLC data from the content. The identifier may be a flag that identifies the VLC and/or distinguishes the VLC data from the content. The identifier (and/or an associated identifier) may identify the content. The one or more devices (e.g., the user device, the media device 120, the display 121, the communication terminal 122, etc.) may take one or more actions based on receiving the VLC data. One or more actions initiated and/or executed based on the VLC data may include registering/authenticating one or more devices to a network, offload data/information associated with the one or more devices and facilitated by Wi-Fi to expand a wireless network, determine a location and/or orientation of the one or more devices, and and/or the like.

The media device 120 may receive content from the content source 127 via the edge device 128. The content may indicate (e.g., via an identifier) that the content includes VLC data (e.g., VLC data embedded in and/or associated with the content by the edge device 128 and/or any other device, etc.). The media device 120 may use the identifier and/or any other attribute of the content/VLC data to determine and/or distinguish the VLC data from the content. The VLC data may or may not be related to and/or associated with the content. For instance, the VLC data may be associated with a device (e.g., a user device, a smart device, a mobile device, a network device, the mobile device 124, etc.) that is related/unrelated to a display device (e.g., the display device 121, etc.) displaying the content, the VLC data may be associated with an advertisement related/unrelated to the content, and/or the like.

The media device 120 may use VLC data (e.g., data/information embedding in content, etc.) to determine one or more control signals. The one or more control signals may be and/or include instructions that control operation of a display device 121, such as one or more components of the display device 121. The media device 120 may send the one or more control signals and content to the display device 121. The one or more control signals may cause the display device 121 communicate VLC data (e.g., data/information embedding in content, etc.) to another device (e.g., the mobile device 124) while displaying the content. The display device 121 may communicate (e.g., provide, send, etc.) the VLC data to another device at a frequency that is imperceptible to a human eye, such as a frequency of 200 Hz or greater. The display device 121 may communicate the VLC data at any frequency.

To communicate the VLC data, the one or more control signals sent by the media device 120 may cause the display device 121 to modify an output of the display device 121. The one or more control signals may cause the display device 121 to modify an output of light emitting diodes (LEDs) of the display device 121 to produce data (e.g. the VLC data) that may be received/detected by a VLC receiver/detector. The one or more control signals may cause the display device 121 to modify the output of the LEDs to generate/produce light signals that represent either a 1 (e.g., a logical 1, etc.) or a 0 (e.g., a logical 0, etc.), similar to the 1's and 0's used in binary computations and/or digital communications. Light signals emitted from the LEDs may have a baseline (e.g., standard, normal, etc.) luminance/output (e.g., brightness, etc.). The baseline luminance/output of the LEDs may be determined by a device (e.g., the media device 120, the mobile device 124, the communication terminal 122, etc.) associated with and/or in communication with the display device 121, such as via a user preference provided and/or configured by the device. The baseline luminance/output of the LEDs may be determined by any suitable method and/or associated device.

For example, either a 1 (e.g., a logical 1, etc.) or a 0 (e.g., a logical 0, etc.) may be represented by modifying the luminance/output of the light emitting diodes (LEDs). Data/information represented by the luminance/output of the light emitting diodes (LEDs) may be based on threshold levels of luminance/output, such that a first threshold luminance/output may represent 1 (e.g., a logical 1, etc.), a second threshold luminance/output may represent 0 (e.g., a logical 0, etc.), and/or a third threshold luminance/output may represent a baseline/null luminance/output. Varying levels (e.g., threshold levels, etc.) of luminance/output may be used to communicate any data/information. One or more control signals may be sent by the media device 120 that cause the display device 121 to modify the luminance/output of the LEDs to be darker (e.g., dimmer, etc.) than the baseline luminance/output to represent a 0 (e.g., a logical 0, etc.). The one or more control signals may cause the display device 121 to modify the luminance/output of the LEDs to be brighter (e.g., lighter) than the baseline luminance/output to represent a 1 (e.g., a logical 1, etc.). The one or more control signals may cause the display device 121 to alternate between outputting 1's and 0's. The one or more control signals may cause the display device 121 to emit/output a baseline luminance/output for the LEDs to represent a break in data/information. VLC data may be and/or represent a series/sequence of 0's and/or 1's, such as '11'. To indicate that there is a series/sequence of logical 1's (e.g., more than one logical 1 to be sent one after another, etc.), the one or more control signals may cause the display device 121 to alternate between producing/outputting (emitting) the brighter than baseline luminance/output of the LEDs and producing/outputting (emitting) the baseline luminance/output of the LEDs. Producing/outputting (emitting) the brighter than baseline luminance/output of the LEDs may represent data (e.g., a logical 1, etc.), and producing/outputting (emitting) the baseline luminance/output of the LEDs may represent a break in the data (e.g., a null value, etc.). Each alternation between producing/outputting (emitting) the brighter than baseline luminance/output of the LEDs and producing/outputting (emitting) the baseline luminance/output of the LEDs may represent a different logical 1 in a series/sequence of logical 1's. To indicate that there is a series/sequence of logical 0's (e.g., more than one logical 0 to be sent one after another, etc.), the one or more control signals may cause the display device 121 to alternate between producing/outputting (emitting) the darker than baseline luminance/output of the LEDs and producing/outputting (emitting) the baseline luminance/output of the LEDs. Producing/outputting (emitting) the darker than baseline luminance/output of the LEDs may represent data (e.g., a logical 0, etc.), and producing/outputting (emitting) the baseline luminance/output of the LEDs may represent a break in the data (e.g., a null value, etc.). Each alternation between producing/outputting (emitting) the darker than baseline luminance/output of the LEDs and producing/outputting (emitting) the baseline luminance/output of the LEDs may represent a different logical 0 in a series/sequence of logical 0's. The LEDs output may return to baseline luminance/output for a time period (e.g., a specific duration) to represent a break in data and/or a different series/sequence of 1's (e.g., logical 1's, etc.) or 0's (e.g., logical 0's, etc.).

To send VLC data, the one or more control signals may modify the luminance/output of the light emitting diodes (LEDs) of the display device 121 to represent 1's (and/or a series of 1's) and 0's (and/or a series of 0's) that may be received and/or interpreted (e.g., determined, decoded, deciphered, etc.) by another device (e.g., the mobile device 124, etc.) as data/information. The display device 121 may receive content from the content source 127. The content include VLC data. The content may indicate (e.g., via an identifier) that VLC data is included with the content. The display device 121 may determine, decode, and/or decipher VLC data from the content. The VLC data may be related to the content. The VLC data may be unrelated to the content. The VLC data may cause the display device 121 to send the VLC data to another device (e.g., the mobile device 124) via VLC. The display device 121 may display the content while sending the VLC data. The display device 121 may display the content while simultaneously sending the VLC data. The display device 121 may send the VLC data at a frequency that is imperceptible to a human eye, such as a frequency of 200 Hz or greater. The display device 121 may send the VLC data at any frequency. The mobile device 124 (or any other device) may include a receiver (e.g., a VLC receiver) that may receive/detect VLC data based on alternations/changes in luminance/output of the LEDs of the display device 121. The mobile device 124 may determine/interpret alternations/changes in luminance/output of the LEDs of the display device 121 as a series/sequence of logical 1's or logical 0's (e.g., data/information, etc.) determined from the displayed content.

Figure 2:
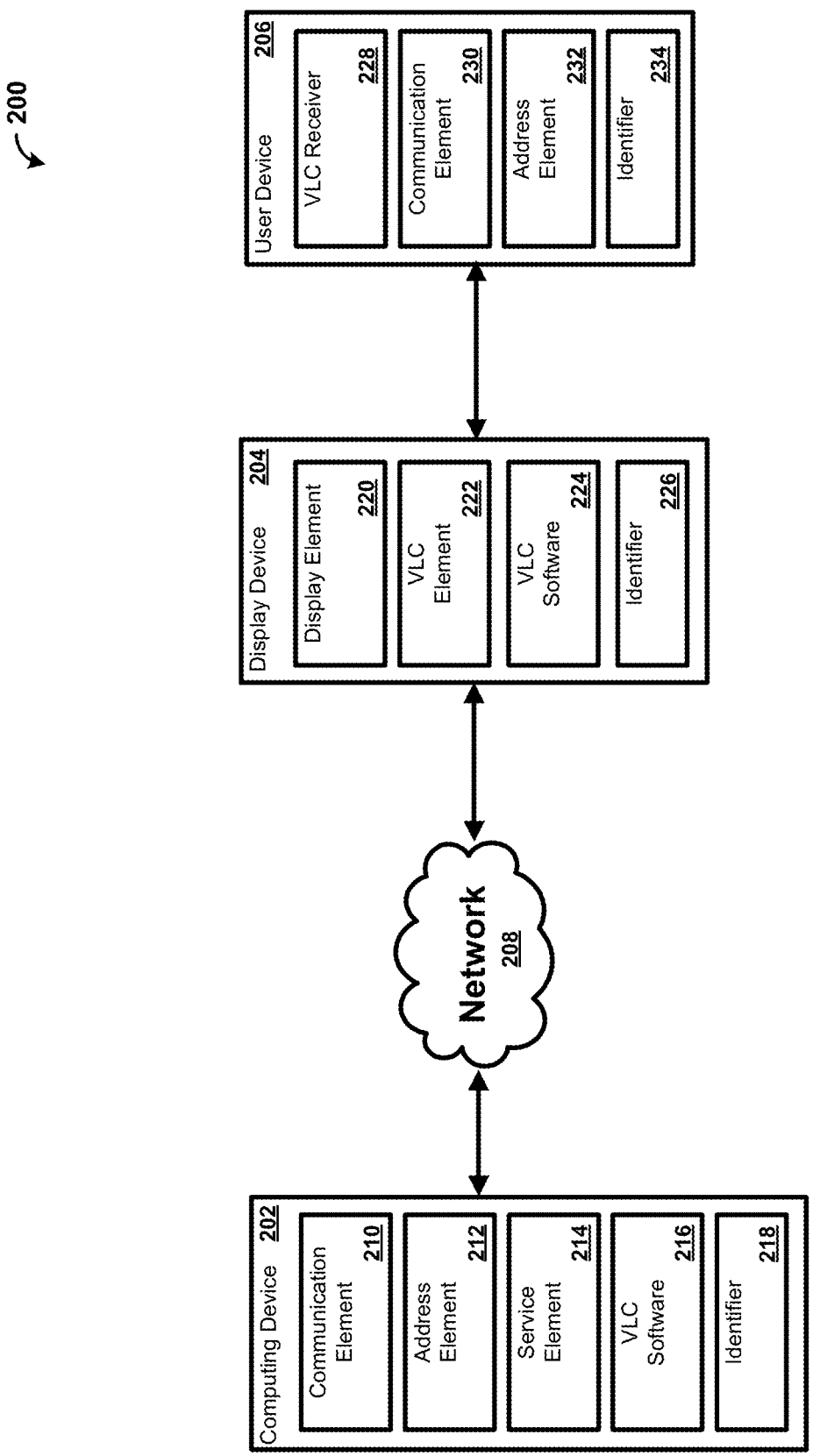
FIG. 2 shows an example system for VLC communication.

FIG. 2 shows a system 200 for visible light communication (VLC). The system 200 may include a computing device 202, a display device 204, and a user device 206. The computing device 202 may communicate with the display device 204 via a network 208 (e.g., the network 116, etc.). The network 208 may support communication between the computing device 202 and the display device 20 via a short-range communication technique (e.g., BLUETOOTH®, near-field communication, infrared, etc.) and/or via a long-range communication technique (e.g., Internet, cellular, satellite, and the like). In some instances, the computing device 202 may communicate with the display device 204 via a direct communication link, channel, and/or interface that does not include the network 208. In some instances, the computing device 202 and the display device 204 may be separate devices. In some instances, the computing device 202 and the display device 204 may be part of and/or components of a single device. The display device 204 may communicate with the user device 206 via VLC.

The computing device 202 (e.g., the media device 120, the communication terminal 122, the application server 126, the content source 127, the edge device 128, etc.) may include a communication element 210, an address element 212, a service element 214, VLC software 216, and an identifier 218.

The communication element 210 may be a wireless transceiver configured to send and receive wireless communications via a wireless network (e.g., the network 208). The communication element 210 may communicate via one or more wireless networks. The communication element 210 may communicate via any network protocol. The computing device 202 may communicate with the display device 204 via the communication element 210.

The computing device 202 may include an address element 212 and a service element 214. The address element 212 may comprise or provide an internet protocol address, a network address, a media access control (MAC) address, an Internet address, or the like. The address element 212 may be used to establish a communication session between the computing device 202 and the display device 204 or other devices and/or networks. The address element 212 may be an identifier or locator of the computing device 202. The address element 212 may be persistent for a particular network (e.g., the network 208).

The service element 214 may comprise an identification of a service provider associated with the computing device 202 and/or with the class of computing device 202. The class of the computing device 202 may be related to a type of device, capability of device, type of service being provided, and/or a level of service (e.g., business class, service tier, service package, etc.). The service element 214 may comprise information relating to or provided by a communication service provider (e.g., Internet service provider) that is providing or enabling data flow such as communication services to the computing device 202. The service element 214 may comprise information relating to a preferred service provider for one or more particular services relating to the computing device 202. The address element 212 may be used to identify or retrieve data from the service element 214, or vice versa. The one or more of the address element 212 and the service element 214 may be stored remotely from the computing device 202. Other information may be represented by the service element 214.

The computing device 202 may be associated with a user identifier or device identifier 218. The device identifier 218 may be any identifier, token, character, string, or the like, for differentiating one user or computing device (e.g., the computing device 202) from another user or computing device (e.g., the user device 206). For example, the device identifier 218 may be an International Mobile Equipment Identity (IMEI) number, an International Mobile Subscriber Identity (IMSI) number, a phone number, a SIM card number, a media access control (MAC) address, and/or the like. The device identifier 218 may identify a user or computing device as belonging to a particular class of users or computing devices. The device identifier 218 may comprise information relating to the computing device 202 such as a manufacturer, a model or type of device, a service provider associated with the computing device 202, a state of the computing device 202, a locator, and/or a label or classifier. Other information may be represented by the device identifier 218.

The computing device 202 may include VLC software 216. The VLC software 216 may be software, firmware, hardware, and/or a combination of software, firmware, and hardware. The VLC software 216 may allow the computing device 202 to determine VLC data embedded within content, and determine one or more control signals from the VLC data. The computing device 202 may receive content from and/or via one or more content sources (e.g., the application server 126, the content source 127, the edge device 128, etc.). The computing device 202 may receive the content via the communication element 210. The VLC software 216 may determine (e.g., decode), from the received content, VLC data embedded in the content. The VLC data may be embedded by the content source or any intermediary device.

The VLC software 216 may determine one or more control signals based on the VLC data. The VLC software 216 may determine the one or more control signals based on the VLC data. The VLC data may indicate one or more messages and/or information/data to send to the user device 206 via the display device 204 according to a visible light communication (VLC) technique. The one or more messages and/or information/data may be packets of information/data (e.g., information/data that originated from and/or is associated with a Wi-Fi network), a device activation message (e.g., device authentication/registration information/data, etc.), and/or the like. The one or more messages and/or information/data may include and/or be associated with an application, Internet Protocol (IP) information, device and/or user notifications (e.g., push notifications, etc.), device and/or user location/orientation identification (e.g., geolocation, GPS, etc.), one or more commands (e.g., operational commands, executable code, etc.) associated with a device, and/or the like.

The one or more control signals determined by the VLC software 216 may control operation of a display device (e.g., the display device 204). The one or more control signals may control operation of one or more components of the display device 204, such as light emitting diodes (LEDs) associated with the display, and so forth. The one or more control signals (determined by the VLC software 216) may cause the display device 204 to send the VLC data to another device (e.g., the user device 206) according to a visible light communication (VLC) technique.

The computing device 202 may send content (e.g., the received content) to the display device 204 for display along with the one or more control signals. The display device 204 may display the content while sending (e.g., simultaneously sending, intermittently sending, etc.) one or more messages and/or information/data. The display device 204 may send the one or more messages and/or information/data at a frequency that is imperceptible to the human eye, such as at a frequency of 200 Hz or greater. The display device 204 may send the one or more messages and/or information/data at any frequency.

The display device 204 (e.g., the display device 121, etc.) may be a light emitting diode (LED) display device, a television, a monitor, etc.). The display device 204 may be associated with a device identifier 226. The device identifier 226 may be any identifier, token, character, string, or the like, for differentiating one user or display device (e.g., the display device 204) from another user or display device. The device identifier 226 may identify a user or display device as belonging to a particular class of users or display devices. The device identifier 226 may comprise information relating to the display device 202 such as a manufacturer, a model or type of device, a service provider associated with the display device 202, a state of the display device 202, a locator, and/or a label or classifier. The device identifier 226 may indicate whether or not the display device 204 is capable of sending VLC data to another device (e.g., the user device 206). Other information may be represented by the device identifier 226.

The display device may communicate/send one or more messages and/or information/data associated with one or more control signals. The one or more control signals may originate from and/or be associated with the computing device 202 (e.g., VLC software 216). The display device 204 may include a display element 220, a VLC element 222, VLC software 224, and an identifier 226. The display device 204 may use the display element 220, the VLC element 222, the VLC software 224, and/or the identifier 226 to communicate/send one or more messages and/or information/data associated with one or more control signals. The display element 220 may be a display (e.g., a liquid crystal display (LCD), a screen, etc.) configured to display content. The display element 220 may be a display of a television, a monitor, a smart device, and so forth. The display device 204 may include a VLC element 222. The VLC element 222 may be one or more components of the display device 204. The VLC element 222 may be light emitting diodes (LEDs) of the display device 204. The VLC element 222 may provide data via VLC (e.g., to the user device 206).

The VLC software 224, based on one or more control signals received from the computing device 202 (e.g., VLC software 216), may control operation of the display element 220 and/or the VLC element 222. The one or more control signals may indicate one or more messages and/or information/data to send to the user device 206 according to a visible light communication (VLC) technique. The VLC software 224, based on the one or more control signals, may control operation of the display element 220 and/or the VLC element 222 to send the one or more messages and/or information/data. As described, the one or more messages and/or information/data may be packets of information/data (e.g., information/data that originated from and/or is associated with a Wi-Fi network), a device activation message (e.g., device authentication/registration information/data, etc.), and/or the like. The one or more messages and/or information/data may include and/or be associated with an application, Internet Protocol (IP) information, device and/or user notifications (e.g., push notifications, etc.), device and/or user location/orientation identification (e.g., geolocation, GPS, etc.), one or more commands (e.g., operational commands, executable code, etc.) associated with a device, and/or the like.

The display device 204 may display (e.g., cause the display element 220 to display) content received from the computing device 202. The display element 220 may display the content while the one or more control signals from the computing device 202 (VLC software 216) cause the VLC element 222 to send the one or more messages and/or information/data. The VLC software 224 may modify the output of the VLC element 222. The VLC software 224 may modify the output of the VLC element 222 to produce light that may represent and/or be interpreted as either a 1 (e.g., a logical 1, etc.) or a 0 (e.g., a logical 0, etc.) by the user device 206.

Luminance/output may be modified, altered, varied, and/or the like to communicate data/information. For example, luminance/output may be modified, altered, varied, and/or the like by the VLC software 224. The VLC software 224 may modify the luminance/output of the VLC element 222 to be darker (e.g., dimmer, etc.) than the baseline luminance/output to represent a 0 (e.g., a logical 0, etc.). The VLC software 224 may modify the luminance/output of the VLC element 222 to be brighter (e.g., lighter) than the baseline luminance/output to represent a 1 (e.g., a logical 1, etc.). In some instances, the VLC software 224 may modify the luminance/output of the VLC element 222 to be darker (e.g., dimmer, etc.) than the baseline luminance/output to represent a 1 (e.g., a logical 1, etc.) and modify the luminance/output of the VLC element 222 to be brighter (e.g., lighter) than the baseline luminance/output to represent a 0 (e.g., a logical 0, etc.). The VLC software 224 may modify the luminance/output of the VLC element 222 to represent any data/information.

For example, the VLC software 224 may cause the VLC element 222 to alternate between outputting 1's and 0's (e.g., light that represents 1's and 0's, etc.). The VLC software 224 may cause the VLC element 222 to emit/output a baseline luminance/output to represent a break in data/information. One or more messages and/or information/data may be and/or be represented/conveyed by a series/sequence of 0's and/or 1's, such as '11'. To indicate that there is a series/sequence of logical 1's (e.g., more than one logical 1 to be sent one after another, etc.), the VLC software 224 may cause the VLC element 222 to alternate between producing/outputting (emitting) the brighter than baseline luminance/output and producing/outputting (emitting) the baseline luminance/output. Producing/outputting (emitting) the brighter than baseline luminance/output of the VLC element 222 may represent data (e.g., a logical 1, etc.), and producing/outputting (emitting) the baseline luminance/output of the VLC element 222 may represent a break in the data (e.g., a null value, etc.). Each alternation between producing/outputting (emitting) the brighter than baseline luminance/output and producing/outputting (emitting) the baseline luminance/output may represent a different logical 1 in a series/sequence of logical 1's.

To indicate that there is a series/sequence of logical 0's (e.g., more than one logical 0 to be sent one after another, etc.), the VLC software 224 may cause the VLC element 222 to alternate between producing/outputting (emitting) the darker than baseline luminance/output and producing/outputting (emitting) the baseline luminance/output. Producing/outputting (emitting) the darker than baseline luminance/output may represent data (e.g., a logical 0, etc.), and producing/outputting (emitting) the baseline luminance/output may represent a break in the data (e.g., a null value, etc.). Each alternation between producing/outputting (emitting) the darker than baseline luminance/output and producing/outputting (emitting) the baseline luminance/output may represent a different logical 0 in a series/sequence of logical 0's. The VLC element 222 may return to the baseline luminance/output for a time period (e.g., a specific duration) to represent a break in data and/or a different series/sequence of 1's (e.g., logical 1's, etc.) or 0's (e.g., logical 0's, etc.). The VLC software 224 may cause the VLC element 222 to output 1's, 0's, a null/baseline value (e.g., light that represents 1's, 0's, and/or a null/baseline value, etc.) and/or any other value/representation according to any sequence, series, pattern, frequency, and/or the like to display, convey and/or communicate any data/information and/or the like.

The VLC software 224 (based on one or more control signals from the computing device 202/VLC software 216) may determine the one or more messages and/or information/data to be sent may be represented as '0110'. The VLC software 224 may determine a timing associated with sending the one or more messages and/or information/data. The VLC software 224 (based on one or more control signals from the computing device 202/VLC software 216) may determine a time period that each bit (e.g., light expression) of the one or more messages and/or information/data is to be produced by the VLC element 222 while content is displayed by the display element 220. The time period may be based on a frequency at which the one or more messages and/or information/data are to be communicated. For instance, if a frequency at which one or more messages and/or information/data are to be communicated is 200 Hz (determined by one or more control signals from the computing device 202/VLC software 216), the VLC software 224 may determine that the VLC element 222 should output light that may represent a 0 (e.g., logical 0, etc.) for 5 ms. After 5 ms has elapsed, the VLC software 224 may cause the VLC element 222 to modify the brightness (e.g., produce light brighter than the baseline) of light that is output. As previously described, the next bit after the logical 0 is a logical 1. The VLC software 224 may modify the brightness of light that is output by the VLC element 222 to represent a 1 (e.g., logical 1, etc.). After 10 ms (e.g., given that a 0 is represented for 5 ms and a 1 is represented for 5 ms), the VLC software 224 may cause the VLC element 222 return to the baseline brightness for a time widow and/or duration that represents a null value, such as 10 ms and/or the like. Accordingly, the VLC software 224 may cause the VLC element 222 to output light that may represent and/or be interpreted as '01-', where the represents the baseline brightness. The baseline brightness may displayed for a period of time. The baseline brightness may displayed for the time period based on the frequency associated with communicating the one or more messages and/or information/data. After 15 ms (e.g., given that a 0 is represented for 5 ms, a 1 is represented for 5 ms, and the baseline brightness (e.g., null) is displayed for 5 ms), the VLC software 224 may cause the VLC element 222 to output light that may represent a 1 (e.g., the next bit in the VLC data '0110'). Accordingly, The VLC software 224 may cause the VLC element 222 to output light that may represent and/or be interpreted as '01-1', where the represents the baseline brightness. After 20 ms (e.g., given that a 0 is represented for 5 ms, a 1 is represented for 5 ms, the baseline brightness is displayed for 5 ms, and another 1 is represented for 5 ms), the VLC software 224 the VLC software 224 may cause the VLC element 222 to output light that may represent 0 (e.g., the next bit in the VLC data '0110'). Accordingly, the VLC software 224 may cause the VLC element 222 to output light that may represent and/or be interpreted as '01-10', where the represents the baseline brightness. In some instances, the VLC software 224 may cause the VLC element to output light that may represent and/or be interpreted as '0110' without utilizing the baseline brightness (e.g., represented by the above). The VLC software 224 may cause the VLC element to output light according to any light emission combination, time period, and/or duration. The VLC software 224 may cause the VLC element to output light that may represent any data information and/or any sequence, series, and/or combination of logical values (e.g., a logical 1, a logical 0, etc.).

The user device 206 (e.g., the mobile device 124, etc.) may be a smart device, a mobile device, a network device, and/or the like. The user device 206 may include, a communication element 230. The communication element 230 may be a wireless transceiver configured to send and receive wireless communications via a wireless network (e.g., the network 208 or another network). The communication element 230 may communicate via one or more wireless networks. The communication element 230 may communicate via a specific network protocol. The user device 206 may communicate with the computing device 202 on the network 208 via the communication element 230. The user device 206 may communicate with a network gateway (e.g., the communication terminal 122, etc.) and/or an access point (e.g., the access point 123, etc.). The user device 206 may communicate with a service or a service provider via the network gateway or access point using the communication element 230. The user device 206 may send data to the service or service provider. The user device 206 may send data to the service or service provider based on one or more messages and/or data/information derived from VLC data (e.g., VLC data embedded with content, etc.).

The user device 206 may include an address element 232. The address element 232 may comprise or provide an internet protocol address, a network address, a media access control (MAC) address, an Internet address, or the like. The address element 232 may be relied upon to establish a communication session between the user device 206 and the service or service provider, or other devices and/or networks. The address element 232 may be used as an identifier or locator of the user device 206. The address element 232 may be persistent for a particular network (e.g., the network 208).

The user device 206 may be associated with a user identifier or device identifier 234. The device identifier 234 may be any identifier, token, character, string, or the like, for differentiating one user or computing device (e.g., the user device 206) from another user or computing device (e.g., the computing device 202). The device identifier 234 may identify a user or computing device as belonging to a particular class of users or computing devices. The device identifier 234 may comprise information relating to the user device 206 such as a manufacturer, a model or type of device, a service provider associated with the user device 206, a state of the user device 206, a locator, and/or a label or classifier. Other information may be represented by the device identifier 234.

The user device 206 may include a VLC receiver 228. The VLC receiver 228 may be any receiver capable of receiving one or more messages and/or information/data determined from VLC data embedded in content. The VLC receiver 228 may be a camera or other sensor capable of detecting light. The VLC receiver 228 may be a transceiver capable of receiving and sending one or more messages and/or information/data determined from VLC data embedded in content. The VLC receiver 228 may be an additional and/or upgraded component of the user device 206, such as an upgraded (e.g., upgraded via software, hardware, an application, etc.) and/or modified transceiver of the user device 206. The VLC receiver 228 may receive one or more messages and/or information/data determined from VLC data embedded in content displayed by the display device 204.

The VLC receiver 228 may receive one or more messages and/or information/data. The one or more messages and/or information/data may be based on (e.g., determined from, etc.) VLC data embedded in content displayed by the display device 204. The one or more messages and/or information/data may originate from and/or be associated with a Wi-Fi network and/or technology. The VLC receiver 228 may receive the one or more messages and/or information/data to increase and/or improve the transfer/communication data/information (e.g., expand a wireless network, etc.). For example, the one or more messages and/or information/data may be used to activate/provision the user device 206. As another example, the one or more messages and/or information/data may be used to assist the user device 206 with navigation and/or geolocation. As another example, the one or more messages and/or information/data may be used to improve tracking of user interaction with advertisements and viewership of programs. For example, the one or more messages and/or information/data may include tracking information (e.g., watermarks, metadata, timestamps, identifiers, etc.) associated with the displayed content and/or content items, such as a television show, a sporting event, a news show, a movie, a music video, an electronic program guide (EPG), an advertisement, and/or the like.

Figure 3:
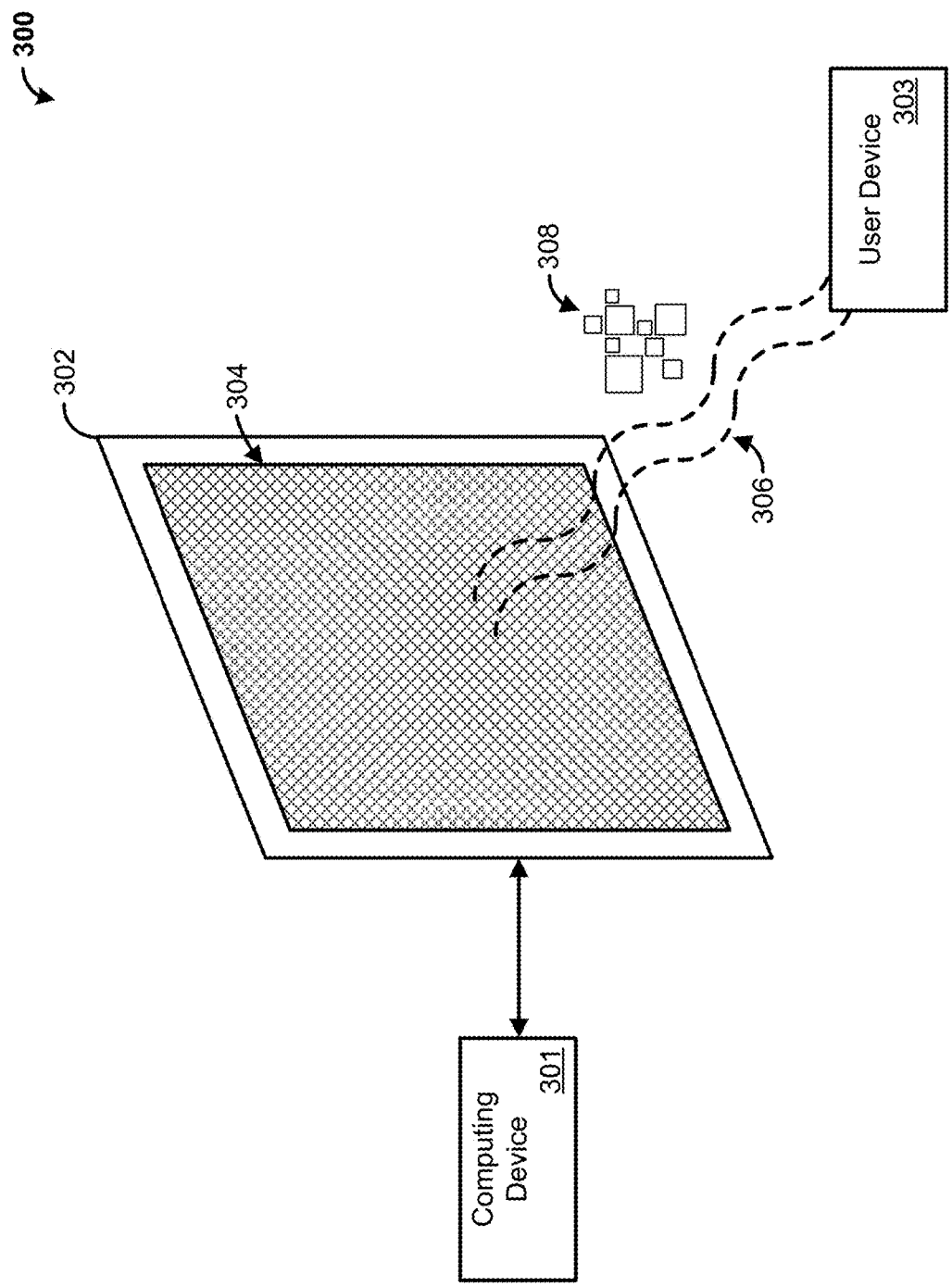
FIG. 3 shows an example system for VLC communication.

FIG. 3 shows a system 300 for visible light communication (VLC). The system 300 may include a computing device 301 (e.g., set-top box, the media device 120, the computing device 202, etc.), a display device 302 (e.g., a light emitting diode (LED) display device, a television, a monitor, the display device 121, the display device 204, etc.), and a user device 303 (e.g., a smart device, a mobile device, network device, the mobile device 124, the user device 206, etc.). The display device 302 may include a VLC element 304 for communicating/sending one or more messages and/or information data via a visible light communication (VLC) technique. The display device 302 and the VLC element are shown in further detail in FIGS. 4A-4C. The display device 302 may receive content embedded with VLC data from the computing device 301. The content may indicate that the content is embedded with and/or includes VLC data. The VLC data may or may not be related to the content. The display device 302 may determine the VLC data from the content. The display device 302 may send the VLC data 308 (one or more messages and/or information/data to be communicated via a visible light communication (VLC) technique. etc.) to the user device 206 via the VLC communication 306. The display device 302 may display the content while sending (e.g., simultaneously sending, intermittently sending, etc.) the VLC data 308 at a frequency that is imperceptible to a human eye, such as at a frequency of 200 Hz or greater. The display device 302 may send the VLC data 308 at any frequency. The display device 302 may display the content while sending (e.g., simultaneously sending, intermittently sending, etc.) the VLC data 308 by pulsing/alternating light intensity (e.g., brightness, etc.) with a baseline luminance of the VLC element 304. The changes in light intensity may be received/detected by the user device 303 and interpreted (e.g., decoded, deciphered, etc.) as one or more messages and/or information/data.

Figure 4A:
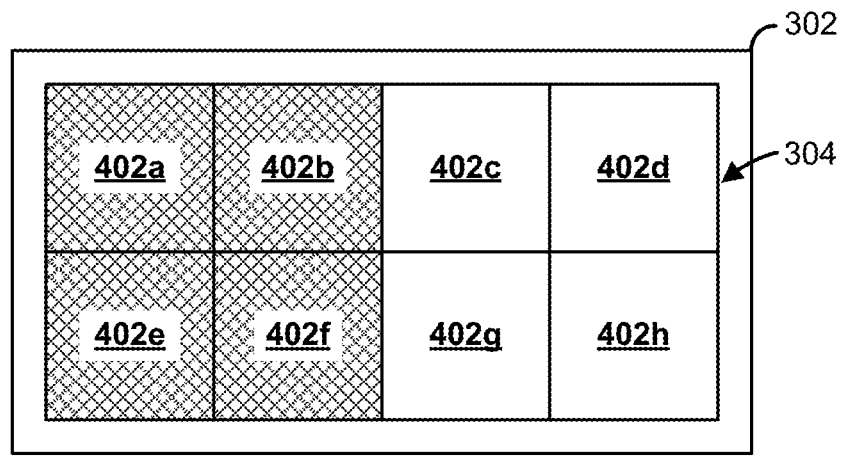
FIGS. 4A-4C shows an example display for VLC communication.
Figure 4B:
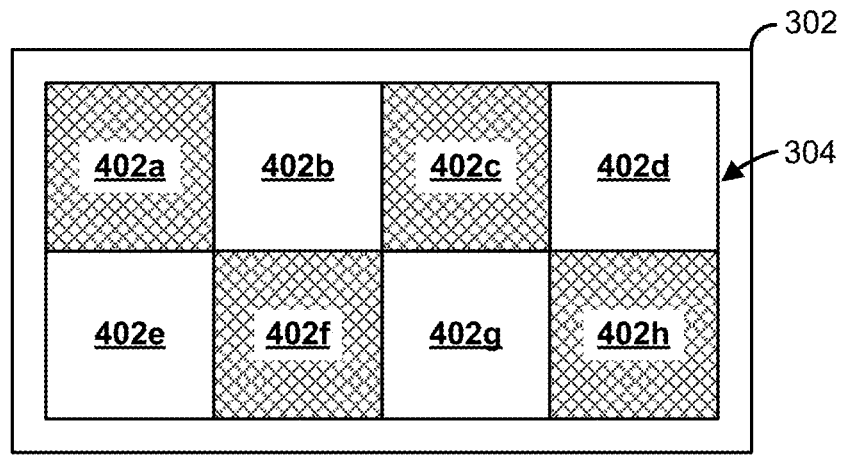
Figure 4C:
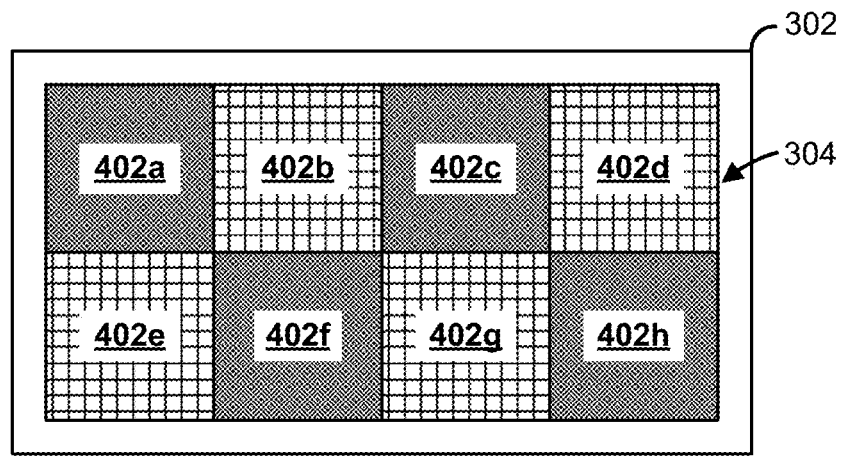

FIGS. 4A-4C show a display for visible light communication (VLC). FIG. 4A shows the display device 302 and the VLC element 304 of FIG. 3. The VLC element 304 is may be broken into zones 402*a*, 402*b*, 402*c*, 402*d*, 402*e*, 402*f*, 402*g*, and 402*h* for communicating one or more messages and/or information/data via a visible light communication (VLC) technique. Each zone (402*a*, 402*b*, 402*c*, 402*d*, 402*e*, 402*f*, 402*g*, and 402*h*) may be independently controlled, such as each zone independently controlled by the VLC element 304 and/or VLC software (e.g., the VLC software 216, etc.). The VLC element 304 and/or VLC software may cause a different output for each zone (402*a*, 402*b*, 402*c*, 402*d*, 402*e*, 402*f*, 402*g*, and 402*h*). For instance, the zones 402*a*, 402*b*, 402*e*, 402*f* may emit light that may represent and/or be interpreted as a 1 (e.g., a logical 1, binary 1, etc.). The zones 402*c*, 402*d*, 402*g*, 402*h* may emit light that may represent and/or be interpreted as a 0 (e.g., a logical 0, binary 0, etc.). The zones 402*c*, 402*d*, 402*g*, 402*h* may emit light that may have a baseline luminance that may represent and/or be interpreted as a null (not used) value. The zones 402*a*, 402*b*, 402*c*, 402*d*, 402*e*, 402*f*, 402*g*, and 402*h* may not emit light that may represented and/or be interpreted as any value and/or data/information. The VLC element 304 and/or VLC software may cause different zones 402*a*, 402*b*, 402*c*, 402*d*, 402*e*, 402*f*, 402*g*, and 402*h* to emit light based on the orientation of a receiving device, such as a user device (e.g., a smart device, a mobile device, a network device, the mobile device 124, the user device 206, the user device 303, etc.). For instance, the user device may be located and/or oriented on a left side of the display device 302. The VLC element 304 and/or VLC software may utilize the zones 402*a*, 402*b*, 402*e*, 402*f* to communicate with the user device on the left side of the display device 304 via a visible light communication (VLC) technique. Because there may not be a user device on the right side of the display device 304, the zones 402*c*, 402*d*, 402*g*, 402*h* may not be utilized. The zones 402*c*, 402*d*, 402*g*, 402*h* may not be utilized to conserve energy. In some cases, the user device may determine, detect, and/or recognize light that may represent and/or be interpreted as any data/information (e.g., a logical 1, a logical 0, etc.) based on an order (e.g., predefined order, etc.) in which the light is output/emitted by the different zones 402*a*, 402*b*, 402*c*, 402*d*, 402*e*, 402*f*, 402*g*, and 402*h*. In some cases, the zones 402*c*, 402*d*, 402*g*, 402*h* may communicate with a second user device. For instance, the second user device may be located on the right side of the display 302.

FIG. 4B shows the display device 302 and the VLC element 304 of FIG. 3. The VLC element 304 may be broken into zones 402*a*, 402*b*, 402*c*, 402*d*, 402*e*, 402*f*, 402*g*, and 402*h* for communicating one or more messages and/or information/data via a visible light communication (VLC) technique. Each zone (402*a*, 402*b*, 402*c*, 402*d*, 402*e*, 402*f*, 402*g*, and 402*h*) may be independently controlled. For example, each zone (402*a*, 402*b*, 402*c*, 402*d*, 402*e*, 402*f*, 402*g*, and 402*h*) may be independently controlled by the VLC element 304 and/or the VLC software (e.g., the VLC software 216, etc.). The VLC element 304 and/or the VLC software may cause a different output for each zone (402*a*, 402*b*, 402*c*, 402*d*, 402*e*, 402*f*, 402*g*, and 402*h*). For instance, the zones 402*a*, 402*c*, 402*f*, 402*h* may emit light that may represent and/or be interpreted as a 1 (e.g., a logical 1, binary 1, etc.). The zones 402*b*, 402*d*, 402*e*, 402*g* may emit light that may represent and/or be interpreted as a 0 (e.g., a logical 0, binary 0, etc.). The zones 402*c*, 402*d*, 402*g*, 402*h* may emit light that may have a baseline luminance that may represent and/or be interpreted as a null (not used) value. The zones 402*a*, 402*b*, 402*c*, 402*d*, 402*e*, 402*f*, 402*g*, and 402*h* may not emit light that may represented and/or be interpreted as any value and/or data/information. The VLC element 304 and/or VLC software may cause different zones 402*a*, 402*b*, 402*c*, 402*d*, 402*e*, 402*f*, 402*g*, and 402*h* to emit light based on the orientation of a receiving device, such as a user device (e.g., a smart device, a mobile device, a network device, the mobile device 124, the user device 206, the user device 303, etc.). The VLC element 304 and/or the VLC software may use the zones 402*a*, 402*c*, 402*f*, 402*h* to communicate one or more messages and/or information/data to a first user device and zones 402*b*, 402*d*, 402*e*, 402*g* to communicate one or more messages and/or information/data to a second user device. The zones 402*a*, 402*b*, 402*c*, 402*d*, 402*e*, 402*f*, 402*g*, and 402*h* may send the one or more messages and/or information/data to first user device and the second user device at different frequencies and the first user device and the second user device may determine which of the zones to communicate with based on settings, configuration, and/or the like of the respective user device, such as a frequency setting for receiving one or more messages and/or information/data via a visible light communication (VLC) technique.

Figure 5:
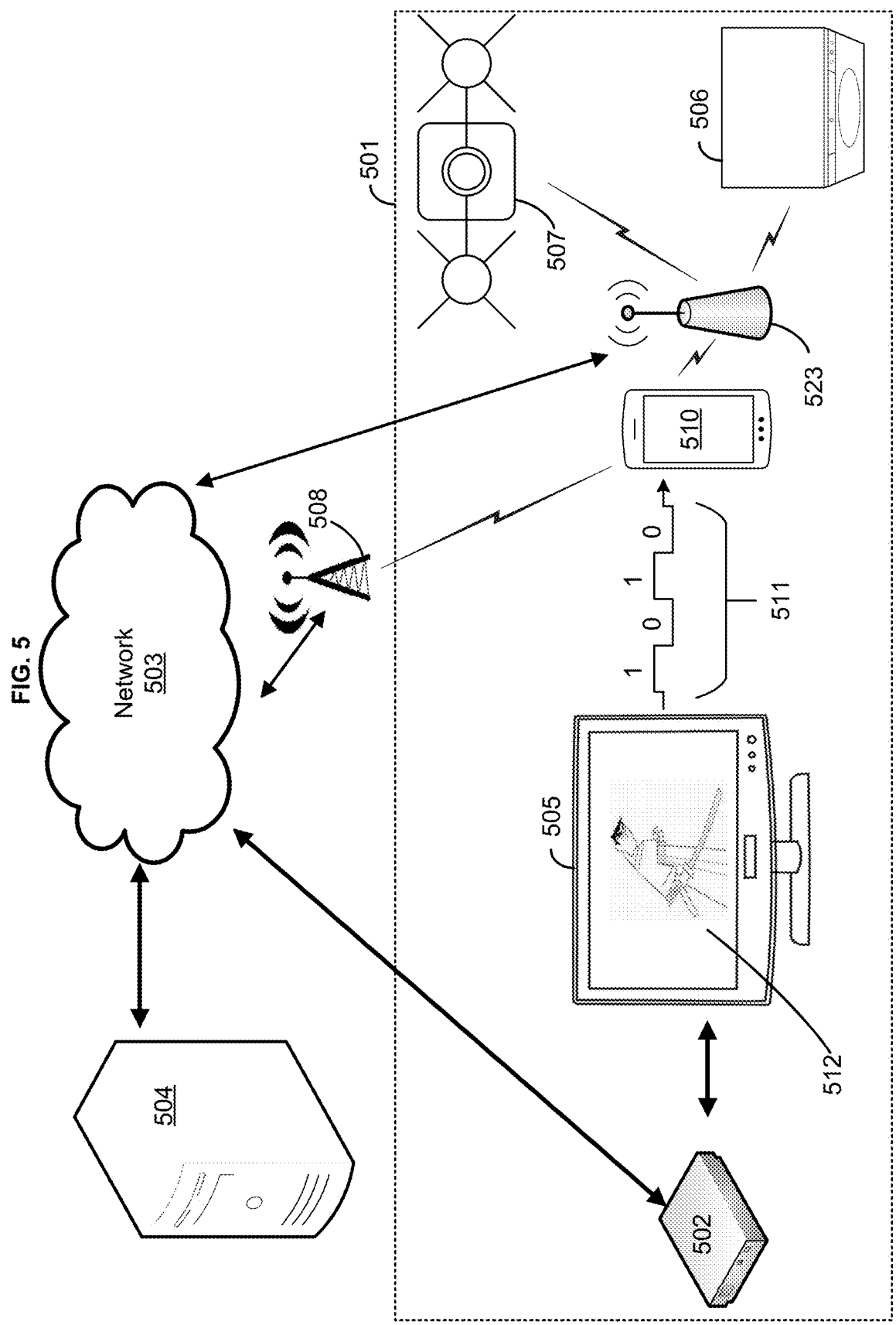
FIG. 5 shows an example system for VLC communication.

FIG. 4C shows the display device 302 and the VLC element 304 of FIG. 3. The VLC element 304 may be broken into zones 402*a*, 402*b*, 402*c*, 402*d*, 402*e*, 402*f*, 402*g*, and 402*h* for communicating one or more messages and/or information/data via a visible light communication (VLC) technique. Each zone (402*a*, 402*b*, 402*c*, 402*d*, 402*e*, 402*f*, 402*g*, and 402*h*) may be independently controlled by the VLC element 304. The VLC element 304 may cause a different output for each zone (402*a*, 402*b*, 402*c*, 402*d*, 402*e*, 402*f*, 402*g*, and 402*h*). For instance, the zones 402*a*, 402*c*, 402*f*, 402*h* may emit light that may represent and/or be interpreted as a 1 (e.g., a logical 1, binary 1, etc.). The zones 402*b*, 402*d*, 402*e*, 402*g* may emit light that may represent and/or be interpreted as a 1 (e.g., a logical 1, binary 1, etc.). However, the 1's (e.g., a logical 1's, binary 1's, etc.) displayed by the respective zones may be different based on a different brightness/luminance of the respective zones. The VLC element 304 and/or VLC software (e.g., the VLC software 216, etc.) may cause different zones 402a, 402b, 402c, 402d, 402e, 402f, 402g, and 402h to emit light to communicate with different receiving devices. The zones 402a, 402b, 402c, 402d, 402e, 402f, 402g, and 402h may send the one or more messages and/or information/data to first user device and the second user device according to the different brightness/luminance of the respective zones. For instance, a first user device and a second user device may determine which of the zones to communicate with based on settings, configuration, and/or the like of the respective user device, such as a brightness/luminance setting for detecting light and determining one or more messages and/or information/data via a visible light communication (VLC) technique. Data/information represented by the luminance/output of the zones 402a, 402b, 402c, 402d, 402e, 402f, 402g, and 402h may be based on threshold levels of luminance/output, such that a first threshold luminance/output may represent 1 (e.g., a logical 1, etc.), a second threshold luminance/output may represent 0 (e.g., a logical 0, etc.), and/or a third threshold luminance/output may represent a baseline/null luminance/output. Varying levels (e.g., threshold levels, etc.) of luminance/output of the zones 402a, 402b, 402c, 402d, 402e, 402f, 402g, and 402h may be used to communicate any data/information (e.g., the 1's and 0's). xxx FIG. 5 shows a system 500 for visible light communication (VLC). VLC may be used in a light fidelity (Li-Fi) network to offload, facilitate, and/or support communications (e.g., a transfer of data/information, etc.) routinely facilitated/supported via a wireless fidelity (Wi-Fi) installation and/or network configuration. Communications routinely facilitated/supported via a wireless fidelity (Wi-Fi) installation and/or network configuration may include communications between devices (e.g., smart devices, appliances, user devices, Internet-of-Things (IOT) devices, controllable devices, etc.) within a premise, such as a user location 501.

The user location 501 (e.g., a home, a building, the user location 119, etc.) may include a local area network (e.g., Wi-Fi, etc.) that is supported by an access point 523 (e.g., a Wi-Fi access point, etc.). The access point 523 may provide a user managed network (e.g., local area network), a service provider managed network (e.g., public network for users of the service provider), and/or the like. For example, the access point 523 may be configured to provide one or more wireless networks in at least a portion of the user location 501. One or more devices within the user location 501 (e.g., the local area Wi-Fi network, etc.), such as a computing device 502 (e.g., a set-top box, the media device 120, the computing device 202, an access point/router, etc.), a smart washer 506, and/or smart lights 507 may be communication via the access point 523. The access point 523 may be configured to provide access to the network 503 to devices configured with a compatible wireless radio, such as the user device 510, the computing device 502, and/or the like, such as any device in communication with the user location 501.

The access point 523 may be in communication with a server 504 (e.g., a computing device, the content source 127, the edge device 128, etc.) exchange data/information, such as data/information associated with the Internet (e.g., Internet-based network traffic, etc.). The access point 523 may be in communication with the server 504 to transmit and/or receive data/information that may be shared with devices in the user location 501, such as a user device 510 (e.g., a mobile device, a smart device, the mobile device 124, the user device 206, etc.), the smart washer 506, and/or the smart lights 507. The access point 523 may share and/or exchange data/information with the user device 510 (or any other device) via Wi-Fi communication. The server 504 may share and/or exchange data/information with one or more devices (e.g., the computing device 504, the user device 510, the smart washer 506, the smart lights 507, etc.) via Wi-Fi communication. Wi-Fi communication, in some instances, may be overburdened. Particularly, an exchange of data/information via Wi-Fi may not be optimal due to a weak Wi-Fi-signal, an overloaded Wi-Fi interface (e.g., an interface of the access point 523, etc.), and/or the like.

To reduce the burden on the Wi-Fi communications, the computing device 502 may share and/or exchange data/information with the user device 510 via a display device 505 (e.g., a light emitting diode (LED) display device, a television, a monitor, the display device 121, the display device 204, display device 302, etc.). In some instances, the computing device 502 and the display device 505 may be separate devices. In some instances, the computing device 502 and the display device 505 may be part and/or components of a single device.

The user device 510 may include a wireless transceiver (e.g., radio frequency (RF) transceiver, cellular transceiver, etc.). The user device 510 may use the wireless transceiver to send the request to the server 504. The user device 510 may send the request via the access point 523 to the server 504. The access point 523 may communicate the request from the user device 510 to the server 504. In some instances, the request may be sent/transmitted from the wireless transceiver of the user device 510 to an access point 508. The access point 508 may be a cellular (e.g., fourth generation (4G), fifth generation (5G), etc.) tower, a wireless hotspot, a satellite tower, and/or the like. The access point 508 may be within range of the user device 510 or remote from the user device 510. The access point 508 may communicate the request from the user device 510 to the server 504.

The request may be a request for data/information, such as a request to access a webpage, a request to access and/or be associated with an application (e.g., an application installed on the user device 510 and/or any other device associated with the user device 510, etc.), a request to perform a search/query, and/or the like. The request may be a request for a content item, such as a request for streaming and/or online content (e.g., a movie, a program, a video/audio feed, etc.). The request may be a request to communicate (e.g., exchange one or more operational commands, adjust settings, etc.) with one or more devices within the user location 501 (e.g., the local area Wi-Fi network, etc.), such as the smart washer 506 and/or the smart lights 507. The request may burden (e.g., cause latency, cause errors, etc.) a network, such as the Wi-Fi network supported by the access point 523 and/or the network 503. The access point 523 may determine that the request may burden a Wi-Fi network associated with the access point 523, such as the local area network of the user location 501. In some instances, the server 504 may determine that the request may burden the network 503.

To reduce the burden on a network, such as the local Wi-Fi network associated with the user location 501 and supported by the access point 523, one or more of the access point 523 or the access point 508 may communicate with the server 504 to support the request from the user device 510 via VLC. In some cases, VLC may also be used to support the request and/or communicate with devices outside a communication range of Wi-Fi communication. VLC may be used to support a network for any reason. One or more of the access point 523 or the access point 508 (or any other device) may determine that support for the request, such as a response to the request, communication of the request, processing of the request, and/or the like may impact communications supported by the Wi-Fi network. In some instances, the server 504 (or any other device) may determine that support for the request, such as a response to the request, communication of the request, processing of the request, and/or the like may impact communications supported by the network 503. The request may be associated with data/information that may cause latency and/or any other conditions/errors in the Wi-Fi network and/or the network 503.

For example, the access point 523 and/or the access point 508 may attempt to support the request via a Wi-Fi network (e.g., a packet switched network, etc.) and determine that packets, frames, data segments, and/or the like associated with the request cause and/or will cause one or more buffers associated with the Wi-Fi network (e.g., devices in communication with the Wi-Fi network, etc.) to overload and/or queue/buffer data/information at or above a threshold level. As another example, the access point 523 and/or the access point 508 may attempt to support the request via the Wi-Fi network and determine that packets, frames, data segments, and/or the like associated with the request cause and/or will cause one or more errors associated with data/information communicated via the Wi-Fi network (e.g., devices in communication with the Wi-Fi network, etc.) to occur and/or propagate at or above a threshold level. The access point 523 and/or the access point 508 (or any other device) may determine that support for the request, such as a response to the request, communication of the request, processing of the request, and/or the like may impact communications supported by the Wi-Fi network by any method, according to any indication/determination, and/or the like.

As another example, the server 504 may attempt to support the request via the network 503 and determine that packets, frames, data segments, and/or the like associated with the request cause and/or will cause one or more buffers associated with the network 503 (e.g., devices in communication with the network 503, etc.) to overload and/or queue/buffer data/information at or above a threshold level. As another example, the server 504 may attempt to support the request via the network 503 and determine that packets, frames, data segments, and/or the like associated with the request cause and/or will cause one or more errors associated with data/information communicated via the network 503 (e.g., devices in communication with the network 503, etc.) to occur and/or propagate at or above a threshold level. The server 504 (or any other device) may determine that support for the request, such as a response to the request, communication of the request, processing of the request, and/or the like may impact communications supported by the network 503 by any method, according to any indication/determination, and/or the like.

The access point 523 (e.g., Wi-Fi access point, etc.) and/or the access point 508 (e.g., cellular access point, etc.), based on a determination that the request and/or the like may impact communications supported by a Wi-Fi network, may communicate with the server 504 to reduce the burden on the Wi-Fi network (and/or communicate with device outside of a range of Wi-Fi communication, etc.). The access point 523 and/or the access point 508 may send a notification, signal, message, indication, and/or the like to the server 504 that the Wi-Fi network may be burdened by the request.

The server 504, based on the notification, the signal, the message, the indication, and/or the like that the Wi-Fi network may be burdened by the request, may determine one or more devices to support the request and reduce the burden on the Wi-Fi network (and/or communicate with device outside of a range of Wi-Fi communication, etc.). In some instances, server 504, based on the determination that the network 503 may be burdened by the request, may determine one or more devices to support the request and reduce the burden on the network 503. The request from the user device 510 may include an identifier of the user device 510. The access point 523 and/or the access point 508 may send the identifier to the server 504. The server 504 may use the identifier to determine a user account, a user profile, and/or the like associated with the user device 510. The user account, the user profile, and/or the like associated with the user device 510 may indicate one or more services (e.g., Internet service, subscription services, service accounts, etc.) and/or service providers associated with the user device 510. The user account, the user profile, and/or the like associated with the user device 510 may indicate one or more devices (e.g., the computing device 502, the display device 504, the smart washer 506, the smart lights 507, etc.) associated with the user device 510 and one or more operational commands, settings, configurations and/or the like associated with the one or more devices. The user account, the user profile, and/or the like associated with the user device 510 may indicate a location (and/or local area network) associated with the user device 510, such as the user location 501. The server 504, based on the user account, the user profile, and/or the like, may determine that user device 510 is associated with the computing device 502 and/or the display device 505, and that the computing device 502 and/or the display device 505 are configured to support visible light communications (VLC).

To support the request from the user device 510 via VLC, the server 504 may send a signal to the computing device 502 and/or the display device 505 that causes the computing device 502 and/or the display device 505 to determine if/that the user device 510 is within proximity (e.g., within a line-of-sight, within a communication range, etc.) to the computing device 502 and/or the display device 505. To determine if/that the user device 510 is within proximity to the computing device 502 and/or the display device 505, the computing device 502 and/or the display device 505 may send a signal (e.g., a message, a push, a ping, light-based signal, etc.) to the user device 510, such as a signal sent via a short-range communication technique (e.g., BLUETOOTH®, near-field communication, infrared, visible light communication (VLC) technique, etc.). The user device 510, may receive the signal to confirm its location (e.g., proximity to the computing device 502 and/or the display device 505). The computing device 502 and/or the display device 505 may send a signal to the server 504 confirming the location of the user device 510 and/or proximity to the computing device 502 and/or the display device 505.

The server 504, may send data/information to the user device 510 to respond to the request from the user device 510. To send data/information to the user device 510 to respond to the request from the user device 510, the server 504 may embed (e.g., encode, etc.) content (e.g., video content, content that may be displayed on the display device 505, etc.) with VLC data. The VLC data may correspond to the data/information responsive to the request from the user device 510. The server 504 may send the content embedded with the VLC data to the computing device 502.

The computing device 502 may use the VLC data embedded in the content to determine one or more control signals. The one or more control signals may be and/or include instructions that control operation of the display device 505, such as one or more components of the display device 505. The computing device 502 may correlate the one or more control signals to the data/information responsive to the request from the user device 510. The computing device 502 may send the one or more control signals and content (received from the server 504) to the display device 505. The one or more control signals may cause the display device 505 to communicate the data/information responsive to the request from the user device 510 to the user device 510 while displaying the content.

To communicate the data/information responsive to the request from the user device 510, the one or more control signals sent by the computing device 502 may cause the display device 505 to modify a luminance/output the display device 505 (via light emitting diodes (LEDs) and/or any other component of the display device 505) to represent/communicate the data/information responsive to the request from the user device 510. The one or more control signals may cause the display device 505 to generate/produce light signals 511 that represent either a 1 (e.g., a logical 1, etc.) or a 0 (e.g., a logical 0, etc.), similar to the 1's and 0's used in binary computations and/or digital communications, that correspond to the data/information responsive to the request from the user device 510. The display device 505 may generate/produce the light signals 511 while displaying the content 512. The display device 505 may generate/produce the light signals 511 at a frequency that is imperceptible to a human eye, such as a frequency of 200 Hz or greater, while displaying the content 512.

The user device 510 may be configured with a visible light communication (VLC) receiver/detector that may receive the light signals 511 and decode/interpret the light signals 511 to determine the data/information responsive to the request from the user device 510. Based on the data/information responsive to the request from the user device 510, the user device may access a webpage, access and/or be associated with an application (e.g., an application installed on the user device 510 and/or any other device associated with the user device 510, etc.), receive results to a search/query, and/or the like. Based on the data/information responsive to the request from the user device 510, the user device may receive a content item, such as streaming and/or online content (e.g., a movie, a program, a video/audio feed, etc.). Based on the data/information responsive to the request from the user device 510, the user device may communicate (e.g., exchange one or more operational commands, adjust settings, etc.) with one or more devices within the user location 501, such as the smart washer 506 and/or the smart lights 507.

Figure 6:
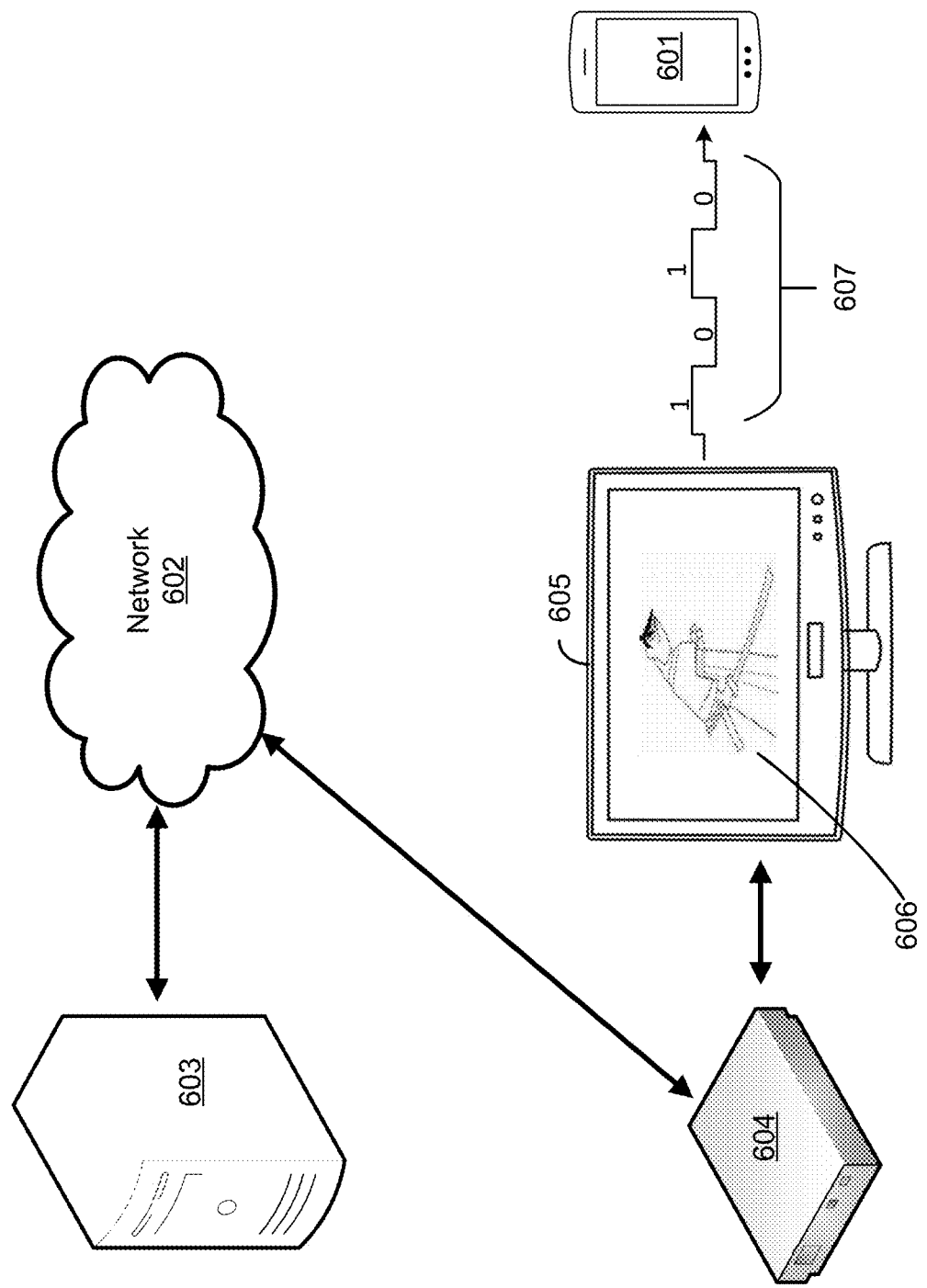
FIG. 6 shows an example system for VLC communication.

FIG. 6 shows a system 600 for visible light communication (VLC). VLC may be used to provision (e.g., authenticate, activate, authorize, register, etc.) a user device 601 (e.g., a mobile device, a smart device, the mobile device 124, the user device 206, the user device 510, etc.) to a network 602 (e.g., a content delivery network, a wireless network, the network 116, the network 208, the network 503, etc.).

Content embedded with VLC data may be used to provision (e.g., authenticate, activate, authorize, register, etc.) the user device 601. The user device 601 may be a new device that a user receives via a direct purchase from a service provider, via mail order, and/or the like. The user device 601 may be associated with a user account, user profile, and/or the like that indicates that the user device 601 is a new (non-provisioned) device. When a user purchases, orders, and/or the like the user device 601 the user account, user profile, and/or the like may be created (e.g., created/generated by a service provider, etc.). Creation of the user account, user profile, and/or the like may cause a server 603 (e.g., a server, a computing device, the content source 127, the edge device 128, the server 504, etc.) to determine one or more devices, such as a computing device 604 (e.g., a set-top box, the media device 120, the computing device 202, the computing device 502, etc.) and a display device 605 (e.g., a light emitting diode (LED) display device, a television, a monitor, the display device 121, the display device 204, display device 302, the display device 505, etc.). In some instances, a user and/or the user device 601 may request to provision the user device 601. For example, when the user powers on, activates, and or the like the user device 601, the user device 601 may send a notification to the server 603 to provision the user device 601.

The server 603, based on the user account, the user profile, and/or the like, may determine that the computing device 604 and/or the display device 605 are configured to support visible light communications (VLC). Based on determining that the computing device 604 and/or the display device 605 associated with the user account, the user profile, and/or the like are configured to support visible light communications (VLC), the server 603 may embed (e.g., encode, etc.) content (e.g., video content, content that may be displayed on the display device 605, etc.) with VLC data. The VLC data may include data/information used to provision (e.g., authenticate, activate, authorize, register, etc.) the user device 601 to the network 602 and/or any other network (service provider network). The data/information used to provision (e.g., authenticate, activate, authorize, register, etc.) the user device 601 to the network 602 may include an activation signal, such as an activation signal that is and/or comprises a number assignment module (NAM) message, service provider network information, a security key, an access token, an application interface/plugin, a mobile station identity (MSID), and/or the like. In some cases, based on determining that the computing device 604 and/or the display device 605 associated with the user account, the user profile, and/or the like are configured to support visible light communications (VLC), the server 603 may send a message (e.g., an email, a push notification, etc.) to the user device 601 and/or a user of the user device 601 with instructions to place the user device 601 in a line-of-sight of the display device 605 to provision the user device 601 to the network 602 (e.g., by receiving data/information used to provision the user device 601 to the network 602 from the display device 605 as described later herein).

The server 603 may send the content embedded with the VLC data (the data/information used to provision the user device 601 to the network 602) to the computing device 604. The content embedded with the VLC data may be sent to the computing device 604 continuously, periodically, and/or at any frequency of occurrence.

The computing device 604 may use the VLC data embedded in the content to determine one or more control signals. The one or more control signals may be and/or include instructions that control operation of the display device 605, such as one or more components of the display device 605. The computing device 604 may correlate the one or more control signals to the data/information used to provision the user device 601 to the network 602. The computing device 604 may send the one or more control signals and content (received from the server 603) to the display device 605. The one or more control signals may cause the display device 605 to communicate the data/information used to provision the user device 601 to the network 602 to the user device 601 while displaying the content 606.

To communicate the data/information used to provision the user device 601 to the network 602, the one or more control signals sent by the computing device 604 may cause the display device 605 to modify a luminance/output the display device 605 (via light emitting diodes (LEDs) and/or any other component of the display device 605) to represent/communicate the data/information used to provision the user device 601 to the network 602. The one or more control signals may cause the display device 605 to generate/produce light signals 607 that represent either a 1 (e.g., a logical 1, etc.) or a 0 (e.g., a logical 0, etc.), similar to the 1's and 0's used in binary computations and/or digital communications, that correspond to the data/information used to provision the user device 601 to the network 602. The display device 605 may generate/produce the light signals 607 while displaying the content 606. The display device 605 may generate/produce the light signals 607 at a frequency that is imperceptible to a human eye, such as a frequency of 200 Hz or greater, while displaying the content 606.

The user device 601 may be configured with a visible light communication (VLC) receiver/detector that may receive the light signals 607 and decode/interpret the light signals 607 to determine the data/information used to provision the user device 601 to the network 602. Based on the data/information used to provision the user device 601 to the network 602, the user device 601 may be provisioned (e.g., authenticated, activated, authorized, registered, etc.) to the network 602. Provisioning the user device 601 to the network 602 may cause a signal to be sent to the server 603 that causes the server 603 to cease embedding content with VLC data (e.g., data/information used to provision the user device 601 to the network 602). The signal may cause the server 603 to update the user account, the user profile, and/or the like to indicate that the user device 601 is provisioned to and/or for the network 602 and/or configured for communication (e.g., ready for use, etc.) within and/or associated with the network 602.

Figure 7:
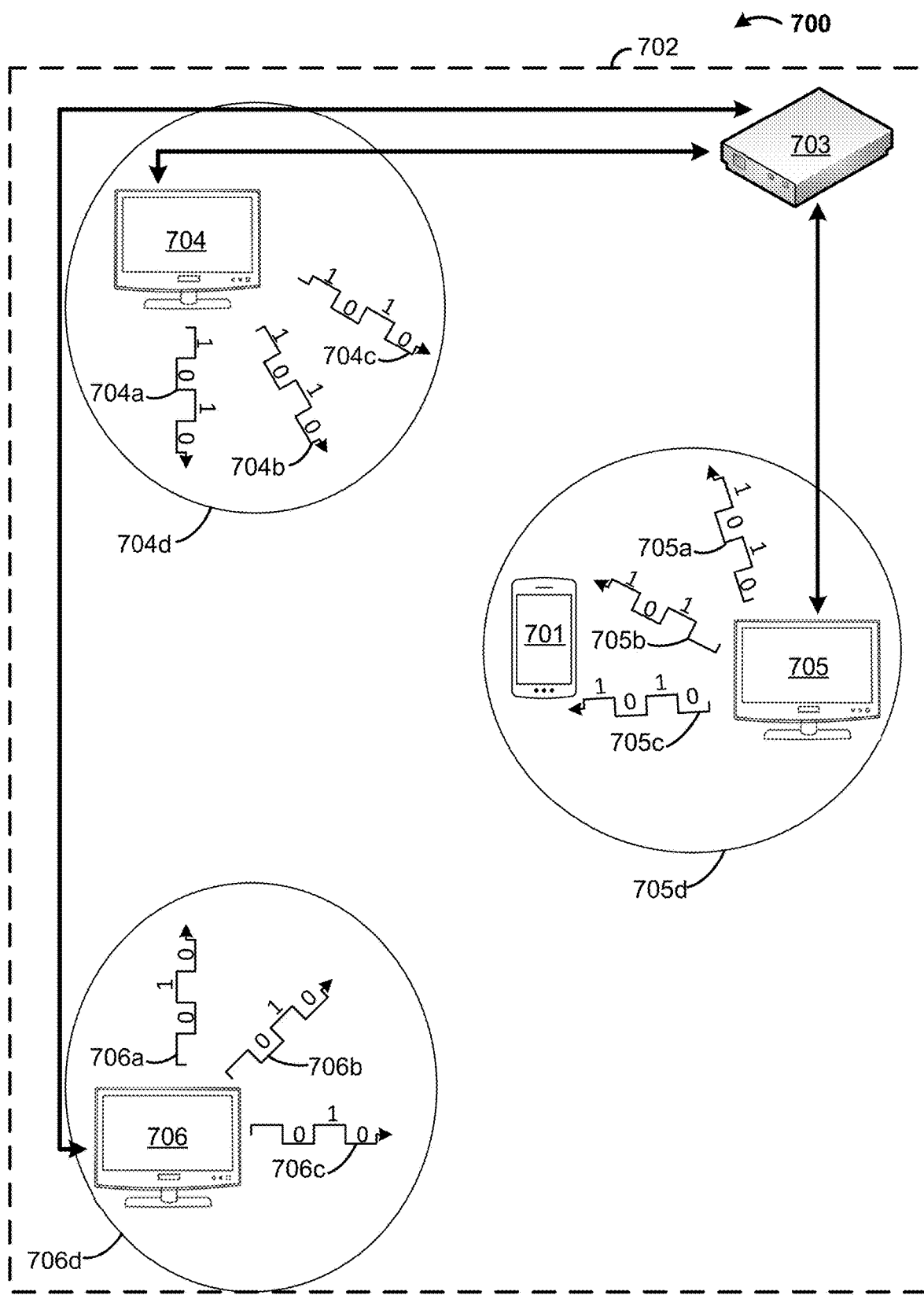
FIG. 7 shows an example system for VLC communication.

FIG. 7 shows a system 700 for visible light communication (VLC). VLC may be used to assist a user and/or user device 701 (e.g., a mobile device, a smart device, the mobile device 124, the user device 206, the user device 510, the user device 601, etc.) navigate an area 702, communicate information/data relating to the area 702 and/or items/devices within the area 702, communicate content to the user device 701, and/or the like. The area 702 may be any building, facility, and/or the like, such as the inside of a retail store, a mall, a business, and/or the like.

The area 702 may include a computing device 703 (e.g., a server, a set-top box, the media device 120, the computing device 202, the computing device 502, the computing device 604, etc.). The computing device 703 may store and/or communicate information relating to one or more devices in the area 702, such as display devices 704, 705, and 706. The display devices 704, 705, and 706 may be and/or include a light emitting diode (LED) display device, a television, a monitor, and/or the like. The computing device 703 may store and/or communicate information/data related to the area 702. The information/data related to the area 702 may include a map of the area 702 and/or location (e.g., geolocation, etc.) information related to the display devices 704, 705, and 706, such as a floor, a department, an area, and/or the like associated with the display devices 704, 705, and 706. For instance, the computing device 703 may store and/or communicate location information that details that the display device 704 is on a first floor of the area 702, that the display device 705 is near an exit door of the area 702, and/or that the display device 706 is near a food court in the area 702. The information/data related to the area 702 may include information relating to the environment of the area 702, such as stores, restrooms and/or other facilities that may be in proximity to the display devices 704, 705, and 706. The information/data related to the area 702 may include sales, incentives, events, and/or the like associated with one or more stores, facilities, and/or the like in the area 702.

The computing device 703 may send the information/data related to the area 702 to the display devices 704, 705, and 706. The computing device 703 may send all or portions of the information/data related to the area 702 to the display devices 704, 705, and 706. For instance, the computing device 703 may only send a portion(s) of the information/data related to the area 702 to each of the display devices 704, 705, and 706 that is relevant to each of the display devices 704, 705, and 706 and/or relative to the user device 701 (e.g., relevant based on a proximity to the display devices 704, 705, and 706). To send the information/data related to the area 702, the computing device 703 may embed (e.g., encode, etc.) content (e.g., video content, advertisements, content that may be displayed on the display devices 704, 705, and 706, etc.) with VLC data. The VLC data may correspond to the information/data related to the area 702. The computing device 703 may embed (e.g., encode, etc.) the content with tracking information (e.g., watermarks, metadata, timestamps, identifiers, etc.) that may be used to track/determine consumption of the content and/or portions of the content.

The computing device 703 may use the VLC data embedded in the content to determine one or more control signals. The one or more control signals may be and/or include instructions that control operation of the display devices 704, 705, and 706, such as one or more components of the display devices 704, 705, and 706. The computing device 703 may correlate the one or more control signals to the information/data related to the area 702. The computing device 703 may send the one or more control signals and content to the display devices 704, 705, and 706. The one or more control signals may cause the display devices 704, 705, and 706 to communicate the information/data related to the area 702 while displaying the content.

To communicate the information/data related to the area 702, the one or more control signals sent by the computing device 703 may cause the display devices 704, 705, and 706 to modify a respective luminance/output of the display devices 704, 705, and 706 (via respective light emitting diodes (LEDs) and/or any other component of the display devices 704, 705, and 706) to represent/communicate the information/data related to the area 702. The one or more control signals may cause the display device 704 to generate/produce light signals 704a-c, the display device 705 to generate/produce light signals 705a-c, and the display device 706 to generate/produce light signals 706a-c, that propagate within line-of-sight areas 704d, 705d, and 706d, respectively. The one or more control signals may cause the display devices 704, 705, and 706 to each generate/produce respective light signals that represent either a 1 (e.g., a logical 1, etc.) or a 0 (e.g., a logical 0, etc.), similar to the 1's and 0's used in binary computations and/or digital communications, that correspond to the information/data related to the area 702. The display devices 704, 705, and 706 may each generate/produce the light signals 704a-c, 705*a-c*, and 706*a-c*, respectively, while displaying the content. The display devices 704, 705, and 706 may generate/produce the light signals 704*a-c*, 705*a-c*, and 706*a-c* at frequencies that are imperceptible to a human eye, such as frequencies of 200 Hz or greater, while displaying the content.

The user device 701 may be configured with a visible light communication (VLC) receiver/detector that may receive the light signals 704*a-c*, 705*a-c*, and 706*a-c* as the user device 701 enters the respective line-of-sight areas 704*d*, 705*d*, and 706*d*. For instance, because the user device 701 is within the line-of-sight area 705*d*, the user device 701 may receive/detect the light signals 705*a-c*. The user device 701 may decode/interpret the light signals 705*a-c* to determine the information/data related to the area 702. Because the user device 701 is within the line-of-sight area 705*d*, the user device 701 may decode/interpret the light signals 705*a-c* to determine a portion of the information/data related to the area 702 that is relative to and/or associated with the display device 705. For instance, if the display device 705 is within a store, the user device 701 may decode/interpret the light signals 705*a-c* to determine one or more sales, promotions, items, and or the like associated with the store. The user device 701 may decode/interpret the light signals 705*a-c* to determine that the user device 701 is in a particular section of a store and/or that a different section is within a proximity to the location of the user device 701.

The user device 701 may decode/interpret the light signals 705*a-c*, and the decoding/interpreting of the light signals 705*a-c* may be tracked and/or recorded as consumption of content by the user device 701. The decoding/interpreting of the light signals 705*a-c* may be tracked and/or recorded as consumption of content by the user device 701 based on the user device sending a notification (e.g., a short-range communication signal/message, a long-range communication signal/message, etc.) to the computing device 703 (or any other device) to indicate that the user device 701 is decoding/interpreting of the light signals 705*a-c*. For instance, content displayed by the display devices 704, 705, and 706 may include tracking information (e.g., watermarks, metadata, timestamps, identifiers, etc.) associated with the displayed content and/or content items, such as a television show, a sporting event, a news show, a movie, a music video, an electronic program guide (EPG), an advertisement, and/or the like.

Figure 8:
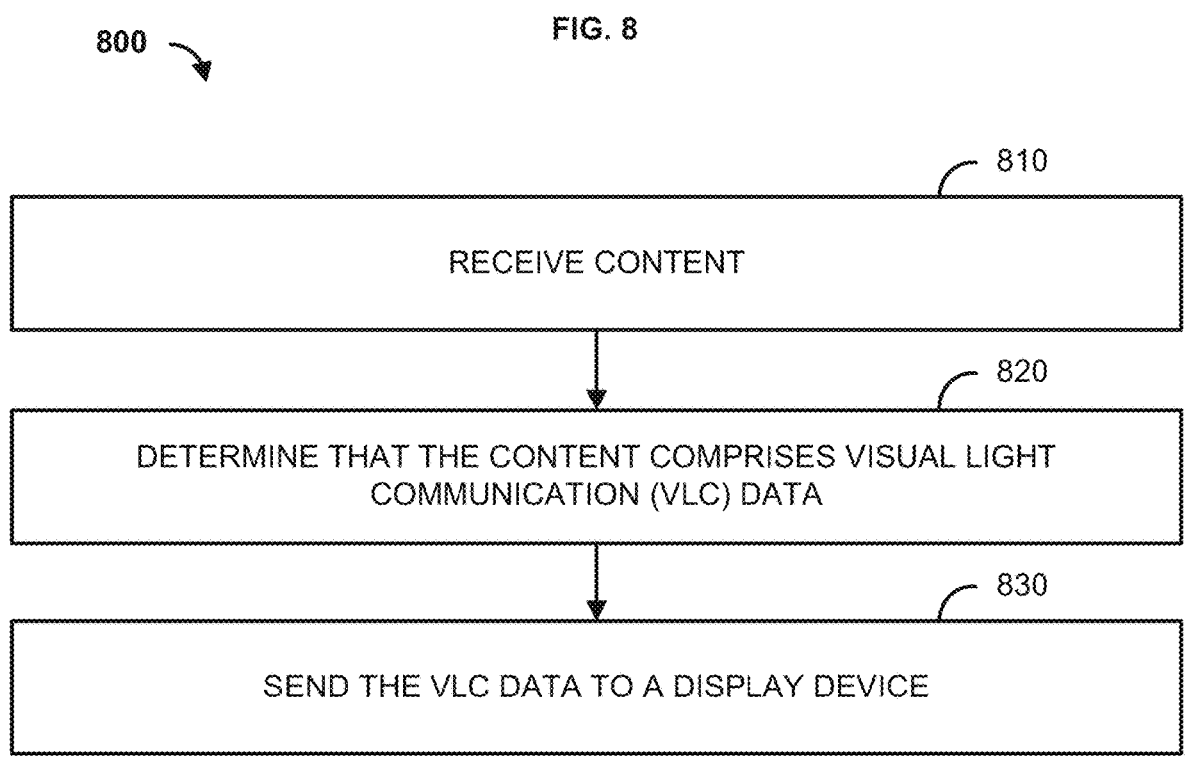
FIG. 8 shows a flowchart of a method for VLC communication.

FIG. 8 shows a flowchart of a method 800 for visible light communication (VLC). At 810, a computing device (e.g., a server, a set-top box, the media device 120, the computing device 202, the computing device 502, the computing device 604, computing device 703, etc.) may receive data. The data may be content, a content item, and/or the like, such as a television show, a sporting event, a news show, a movie, a music video, an electronic program guide (EPG), an advertisement, and/or the like. The data may be received from a content source. The data may include VLC data. The content source (or an intermediate device) may embed (e.g., encode, etc.) the data with VLC data. The VLC data may correspond to data/information used to support a wireless network, provision a service, navigate and receive information associated with an area, track content and/or content item consumption, and more.

At 820, the data may be determined to include the VLC data. In some instances, the computing device may not need to and or be required to determine that the data includes the VLC data. The computing device may send/provide the data to a display device (e.g., a light emitting diode (LED) display device, a television, a monitor, the display device 121, the display device 204, display device 302, the display device 505, etc.). The display device may render and/or display the data to communicate via VLC. In some instances, the computing device may analyze the data to determine that the data includes an identifier of the VLC data, such as watermarks, metadata, timestamps, and/or any other identifier. The computing device may use the identifier to distinguish the data (content/content item) from the VLC data.

At 830, the VLC data may be sent/provided to a display device (e.g., a light emitting diode (LED) display device, a television, a monitor, the display device 121, the display device 204, display device 302, the display device 505, etc.). The computing device may send the data and the VLC data to the display device. For example, content (data) sent to the display device for display may include VLC data. The computing device, based on the VLC data embedded in the data, may determine one or more control signals. The one or more control signals may be and/or include instructions that control operation of the display device, such as one or more components of the display device. The computing device may correlate the one or more control signals to the VLC data. The computing device may send the one or more control signals and the data embedded with the VLC data to the display device. The one or more control signals may cause the display device to communicate the VLC data to another device, such as a user device (e.g., a mobile device, a smart device, the mobile device 124, the user device 206, the user device 510, the user device 601, the user device 701, etc.). The one or more control signals may cause the display device to communicate the VLC data to another device while displaying the data (content/content item).

To communicate the VLC data to another device, the one or more control signals may cause the display device to modify a luminance/output the display device (via light emitting diodes (LEDs) and/or any other component of the display device) to represent/communicate the VLC data. The one or more control signals may cause the display device to generate/produce light signals that represent either a 1 (e.g., a logical 1, etc.) or a 0 (e.g., a logical 0, etc.), similar to the 1's and 0's used in binary computations and/or digital communications, that correspond to the VLC data. The display device may generate/produce the light signals displaying the data (content/content item). The display device may generate/produce the light signals at a frequency that is imperceptible to a human eye, such as a frequency of 200 Hz or greater, while displaying the data (content/content item).

The other device, such as the user device, may be configured with a visible light communication (VLC) receiver/detector that may receive the light signals and decode/interpret the light signals to determine the VLC data. Based on the VLC data, the user device may access a webpage, access and/or be associated with an application (e.g., an application installed on the user device and/or any other device associated with the user device, receive results to a search/query, and/or the like). Based on the VLC data, the user device may receive a content item, such as streaming and/or online content (e.g., a movie, a program, a video/audio feed, etc.). Based on the VLC data, the user device may communicate (e.g., exchange one or more operational commands, adjust settings, etc.) with one or more devices, such as a smart appliance, smart light, and/or any other smart device. Based on the VLC data, the user device may receive information/data that may have originated and/or be associated with a Wi-Fi and/or any other wireless network.

Figure 9:
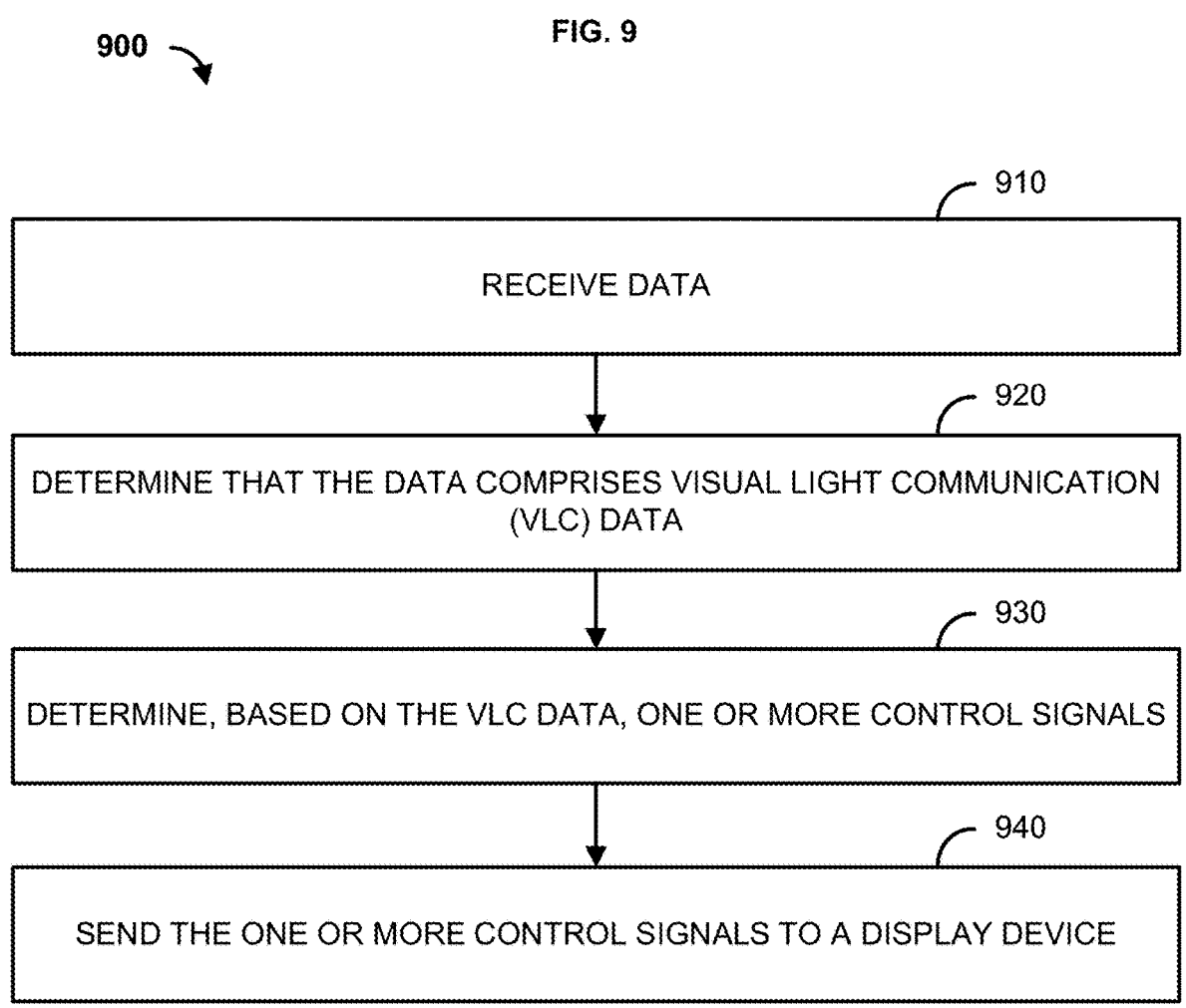
FIG. 9 shows a flowchart of a method for VLC communication.

FIG. 9 shows a flowchart of a method 900 for visible light communication (VLC). At 910, a computing device (e.g., a server, a set-top box, the media device 120, the computing device 202, the computing device 502, the computing device 604, computing device 703, etc.) may receive data. The data may be content, a content item, and/or the like, such as a television show, a sporting event, a news show, a movie, a music video, an electronic program guide (EPG), an advertisement, and/or the like. The data may be received from a content source. The data may include VLC data. The content source (or an intermediate device) may embed (e.g., encode, etc.) the data with VLC data. The VLC data may correspond to data/information used to support a wireless network, provision a service, navigate and receive information associated with an area, track content and/or content item consumption, and more.

At 920, the data may be determined to include the VLC data. The computing device may analyze the data to determine that the data includes an identifier of the VLC data, such as watermarks, metadata, timestamps, and/or any other identifier. The computing may use the identifier to distinguish the data (content/content item) from the VLC data.

At 930, one or more control signals may be determined and/or generated. The computing device, based on the VLC data embedded in the data, may determine and/or generate one or more control signals. The one or more control signals may be and/or include instructions that control operation of the display device, such as one or more components of the display device. The computing device may correlate the one or more control signals to the VLC data.

At 940, the one or more control signals may be sent to a display device (e.g., a light emitting diode (LED) display device, a television, a monitor, the display device 121, the display device 204, display device 302, the display device 505, etc.). The computing device may send the one or more control signals and the data embedded with the VLC data to the display device. In some instances, the display device may determine and/or generate the one or more control signals. The display device may determine and/or generate the one or more control signals based on data/content displayed by the display device. The one or more control signals may cause the display device to communicate the VLC data to another device, such as a user device (e.g., a mobile device, a smart device, the mobile device 124, the user device 206, the user device 510, the user device 601, the user device 701, etc.). The one or more control signals may cause the display device to communicate the VLC data to another device while displaying the data (content/content item).

To communicate the VLC data to another device, the one or more control signals may cause the display device to modify a luminance/output the display device (via light emitting diodes (LEDs) and/or any other component of the display device) to represent/communicate the VLC data. The one or more control signals may cause the display device to generate/produce light signals that represent either a 1 (e.g., a logical 1, etc.) or a 0 (e.g., a logical 0, etc.), similar to the 1's and 0's used in binary computations and/or digital communications, that correspond to the VLC data. The display device may generate/produce the light signals displaying the data (content/content item). The display device may generate/produce the light signals at a frequency that is imperceptible to a human eye, such as a frequency of 200 Hz or greater, while displaying the data (content/content item).

Figure 10:
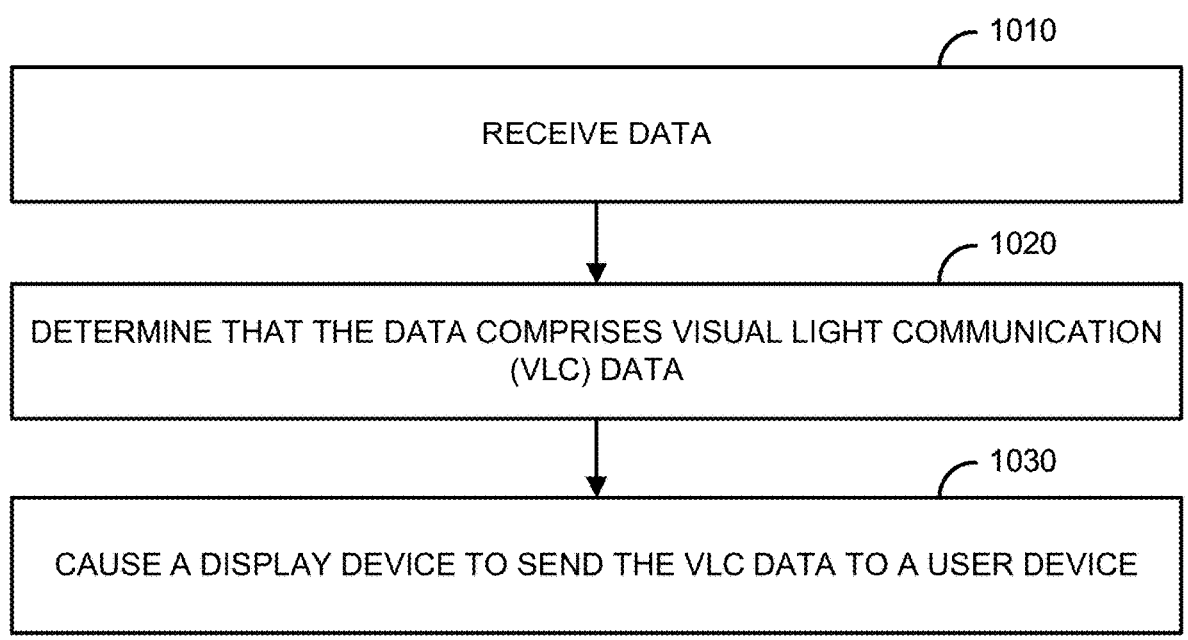
FIG. 10 shows a flowchart of a method for VLC communication.

FIG. 10 shows a flowchart of a method 1000 for visible light communication (VLC). At 1010, a computing device (e.g., a server, a set-top box, the media device 120, the computing device 202, the computing device 502, the computing device 604, computing device 703, etc.) may receive data. The data may be content, a content item, and/or the like, such as a television show, a sporting event, a news show, a movie, a music video, an electronic program guide (EPG), an advertisement, and/or the like. The data may be received from a content source. The data may include VLC data. The content source (or an intermediate device) may embed (e.g., encode, etc.) the data with VLC data. The VLC data may correspond to data/information used to support a wireless network, provision a service, navigate and receive information associated with an area, track content and/or content item consumption, and more.

At 1020, the data may be determined to include the VLC data. The computing device may analyze the data to determine that the data includes an identifier of the VLC data, such as watermarks, metadata, timestamps, and/or any other identifier. The computing may use the identifier to distinguish the data (content/content item) from the VLC data.

At 1030, the VLC data may be sent to a user device (e.g., a mobile device, a smart device, the mobile device 124, the user device 206, the user device 510, the user device 601, the user device 701, etc.). To send the VLC data to the user device, the computing device, based on the VLC data embedded in the data, may determine one or more control signals. The one or more control signals may be and/or include instructions that control operation of a display device (e.g., a light emitting diode (LED) display device, a television, a monitor, the display device 121, the display device 204, display device 302, the display device 505, etc.), such as one or more components of the display device. The computing device may correlate the one or more control signals to the VLC data. The one or more signals may control operation of the display device to send the VLC data to the user device.

The computing device may send the one or more control signals to the display device. The computing device may send the one or more control signals and the data embedded with the VLC data to the display device. The one or more control signals may cause the display device to communicate the VLC data to the user device. The one or more control signals may cause the display device to communicate the VLC data to the user device while displaying the data (content/content item) by modifying a luminance/output the display device (via light emitting diodes (LEDs) and/or any other component of the display device) to represent/communicate the VLC data. The one or more control signals may cause the display device to generate/produce light signals that represent either a 1 (e.g., a logical 1, etc.) or a 0 (e.g., a logical 0, etc.), similar to the 1's and 0's used in binary computations and/or digital communications, that correspond to the VLC data. The display device may generate/produce the light signals displaying the data (content/content item). The display device may generate/produce the light signals at a frequency that is imperceptible to a human eye, such as a frequency of 200 Hz or greater, while displaying the data (content/content item).

The user device may be configured with a visible light communication (VLC) receiver/detector that may receive the light signals and decode/interpret the light signals to determine the VLC data. Based on the VLC data, the user device may access a webpage, access and/or be associated with an application (e.g., an application installed on the user device and/or any other device associated with the user device, receive results to a search/query, and/or the like). Based on the VLC data, the user device may receive a content item, such as streaming and/or online content (e.g., a movie, a program, a video/audio feed, etc.). Based on the VLC data, the user device may communicate (e.g., exchange one or more operational commands, adjust settings, etc.) with one or more devices, such as a smart appliance, smart light, and/or any other smart device. Based on the VLC data, the user device may receive information/data that may have originated and/or be associated with a Wi-Fi and/or any other wireless network.

Figure 11:
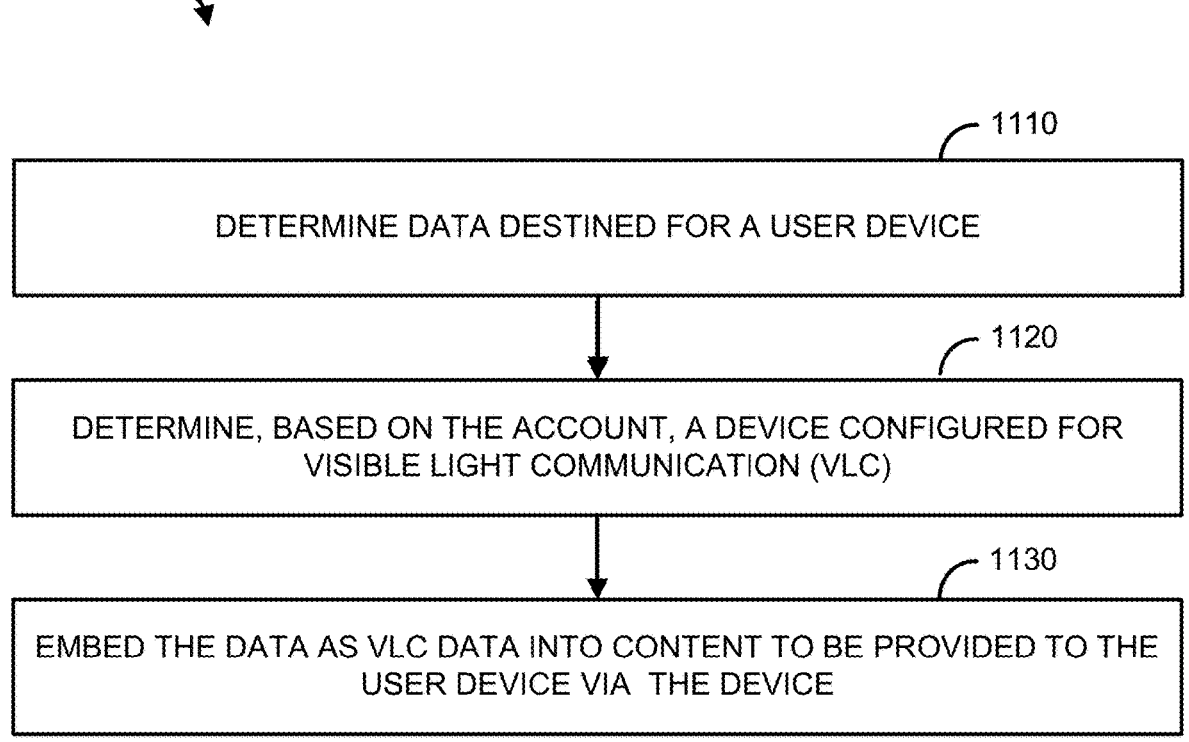
FIG. 11 shows a flowchart of a method for VLC communication.

FIG. 11 shows a flowchart of a method 1100 for visible light communication (VLC). VLC may be used to communicate data/information. For example, VLC may be used in a light fidelity (Li-Fi) network to offload, facilitate, and/or support communications (e.g., a transfer of data/information, etc.) facilitated/supported via a wireless fidelity (Wi-Fi) installation and/or network configuration. For example, communications facilitated/supported via a wireless fidelity (Wi-Fi) installation and/or network configuration may include communications between devices (e.g., smart devices, appliances, user devices, Internet-of-Things (TOT) devices, controllable devices, etc.) within a premise and/or local area network At 1110, a computing device (e.g., a server, the content source 127, the edge device 128, etc.) may receive data. The data may be content, a content item, and/or the like, such as a television show, a sporting event, a news show, a movie, a music video, an electronic program guide (EPG), an advertisement, and/or the like.

The computing device may determine that the data is addressed to a user device (e.g., a mobile device, a smart device, the mobile device 124, the user device 206, the user device 510, the user device 601, the user device 701, etc.). The computing device may determine that the data is addressed to the user device based on a request from the user device for the data. The user device may send a request for the data, such as a request to access a webpage, a request to access and/or be associated with an application (e.g., an application installed on the user device and/or any other device associated with the user device, etc.), a request to perform a search/query, a request for a content item (e.g., a streaming content item, an online content item, a movie, a program, a video/audio feed, etc.), a request to communicate (e.g., exchange one or more operational commands, adjust settings, etc.) with one or more devices associated with the user device (e.g., an appliance, a display device, an audio device, a smart switch, a smart lightbulb, etc.).

At 1120, the computing device may determine that the user device is associated with a VLC-enabled device. The computing device may determine that the user device is associated with a VLC-enabled device based on any method. For example, the computing device may determine that the user device is associated with a VLC-enabled device based on an account associated with the user device. The request from the user device may include an identifier of the user device. The identifier may be and/or include a token, a character, a string/series of characters, an International Mobile Equipment Identity (IMEI) number, an International Mobile Subscriber Identity (IMSI) number, a phone number, a SIM card number, a media access control (MAC) address, and/or the like. The computing device may use the identifier to determine a user account, a user profile, and/or the like associated with the user device. The computing device may determine that the user account is associated with a VLC-enabled device. The user account, the user profile, and/or the like may indicate one or more VLC-enabled devices (devices associated with VLC and/or configured to send data via VLC, etc.) associated with the user device. The user account, the user profile, and/or the like may indicate one or more operational commands, settings, configurations and/or the like associated with the one or more VLC-enabled devices. The user account, the user profile, and/or the like may indicate one or more services (e.g., Internet service, subscription services, service accounts, etc.) and/or service providers associated with the user device. The user account, the user profile, and/or the like may indicate any information associated with the user device.

At 1130, the computing device may embed the data as VLC data (information/data to be communicated via VLC, etc.) into a data stream addressed to a VLC-enabled device of the one or more VLC-enabled devices. The VLC data embedded in the data stream may correspond to data/information used to support a wireless network, provision a service, navigate and receive information associated with an area, track content and/or content item consumption, and more.

To reduce the burden on a Wi-Fi network and support the request from the user device for the data, the computing device may associate VLC data with a data stream addressed to the VLC-enabled device. For example, the computing device may embed the data as VLC data (information/data to be communicated via VLC, etc.) into a data stream addressed to the VLC-enabled device to reduce the burden on a Wi-Fi network and support the request from the user device for the data. To support the request from the user device, the computing device may send a signal to the VLC-enabled device. The VLC-enabled device may use the VLC data embedded in the data stream to determine one or more control signals. The one or more control signals may be and/or include instructions that control operation of a display device, such as one or more components of the display device. The VLC-enabled device may correlate the one or more control signals to the requested data (from the user device). The VLC-enabled device may send the one or more control signals and the data stream to the display device. The one or more control signals may cause the display device to communicate the requested data (from the user device) to the user device while displaying the data stream. The computing device may associate VLC data with a data stream addressed to the VLC-enabled device based on any suitable method.

To communicate the requested data (from the user device) to the user device while displaying the data stream, the one or more control signals may cause the display device to modify a luminance/output the display device (via light emitting diodes (LEDs) and/or any other component of the display device) to represent/communicate the requested data (from the user device). The one or more control signals may cause the display device to generate/produce light signals that represent either a 1 (e.g., a logical 1, etc.) or a 0 (e.g., a logical 0, etc.), similar to the 1's and 0's used in binary computations and/or digital communications, that correspond to the requested data (from the user device). The display device may generate/produce the light signals while displaying the data stream. The display device may generate/produce the light signals at a frequency that is imperceptible to a human eye, such as a frequency of 200 Hz or greater, while displaying the data stream. The user device may be configured with a visible light communication (VLC) receiver/detector that may receive the light signals and decode/interpret the light signals as the requested data (from the user device).

Figure 12:
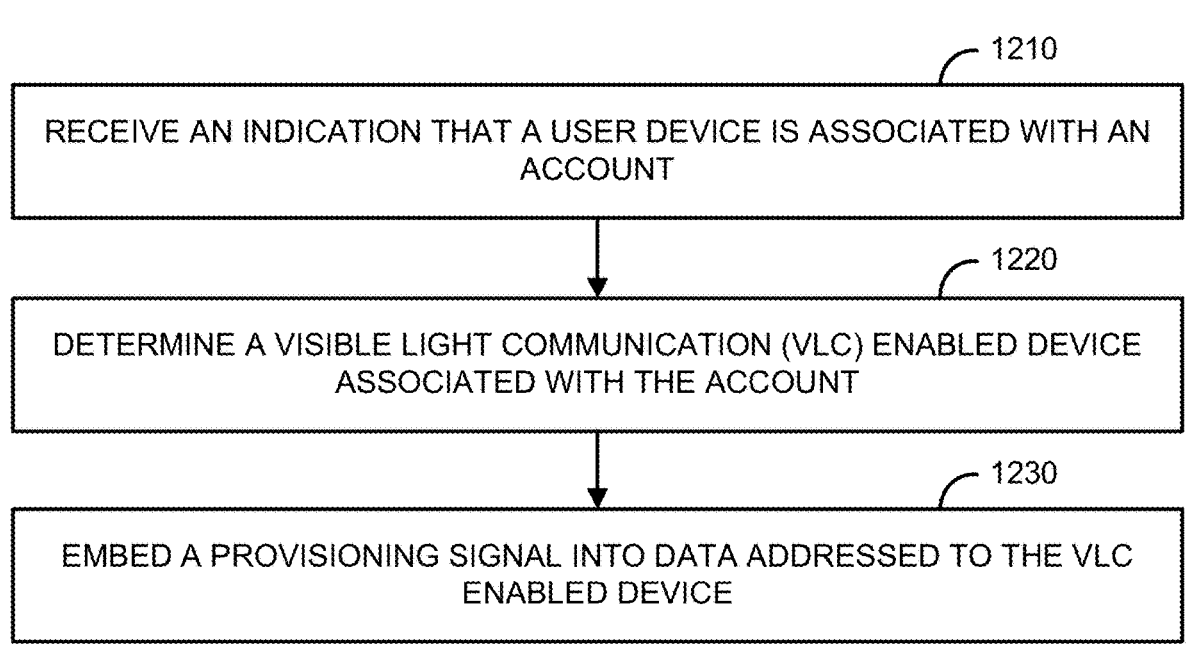
FIG. 12 shows a flowchart of a method for VLC communication.

FIG. 12 shows a flowchart of a method 1200 for visible light communication (VLC). VLC may be used to provision (e.g., authenticate, activate, authorize, register, etc.) a user device (e.g., a mobile device, a smart device, the mobile device 124, the user device 206, the user device 510, the user device 601, etc.) to a network (e.g., a content delivery network, a wireless network, the network 116, the network 208, the network 503, etc.). At 1210, a computing device (e.g., a server, the content source 127, the edge device 128, etc.) may receive an indication that the user device is associated with a user account, a user profile, and/or the like. The user device may be a new device that a user receives via a direct purchase from a service provider, via mail order, and/or the like. When the user receives via a direct purchase from a service provider, via mail order, and/or the like the user device, the user account, the user profile, and/or the like may be created and/or updated, and the computing device may receive the indication that the user device is associated with the user account, the user profile, and/or the like.

At 1220, the computing device may determine a VLC-enabled device (e.g., a device associated with VLC and/or configured to send data via VLC, etc.), such as a VLC-enabled device associated with the user account, the user profile, and/or the like. For example, the computing device may determine the VLC-enabled device based on the indication that the user device is associated with the user account, the user profile, and/or the like.

At 1230, the computing device may embed an activation signal into a data stream addressed to the VLC-enabled device. The data stream may be associated with content and/or a content item, such as video content, or any content/content item that may be displayed by a display device. The data stream may be may be sent to the VLC-enabled device continuously, periodically, and/or at any frequency of occurrence. The activation signal may be and/or include a number assignment module (NAM) message, service provider network information, a security key, an access token, an application interface/plugin, a mobile station identity (MSID), and/or the like.

The computing device (or a device associated with the computing device) may send a message (e.g., an email message, a push notification, etc.) to the user device and/or a user of the user device with instructions to place the user device in a line-of-sight of a VLC-enabled display device to provision the user device to the network (e.g., based on the activation signal and/or by receiving additional data/information used to provision the user device to the network from the VLC-enabled display device). For example, the VLC data embedded in the content to determine one or more control signals. The VLC-enabled display device may receive one or more control signals that control operation of the VLC-enabled display device, such as one or more components of the VLC-enabled display device. The one or more control signals may correlate to the activation signal (or additional data/information used to provision the user device to the network). The one or more control signals may cause the VLC-enabled display device to communicate the activation signal (or additional data/information used to provision the user device to the network) to the user device while displaying the data stream.

To communicate the activation signal (or additional data/information used to provision the user device to the network) to the user device while displaying the data stream, the one or more control signals may cause the VLC-enabled display device to modify a luminance/output the VLC-enabled display device (via light emitting diodes (LEDs) and/or any other component of the VLC-enabled display device) to represent/communicate the activation signal (or additional data/information used to provision the user device to the network). The one or more control signals may cause the VLC-enabled display device to generate/produce light signals that represent either a 1 (e.g., a logical 1, etc.) or a 0 (e.g., a logical 0, etc.), similar to the 1's and 0's used in binary computations and/or digital communications, that correspond to the activation signal (or additional data/information used to provision the user device to the network). The VLC-enabled display device may generate/produce the light signals while displaying the data stream. The VLC-enabled display device may generate/produce the light signals at a frequency that is imperceptible to a human eye, such as a frequency of 200 Hz or greater, while displaying the data stream.

The user device may be configured with a visible light communication (VLC) receiver/detector that may receive the light signals and decode/interpret the light signals to determine the activation signal (or additional data/information used to provision the user device to the network). Based on the activation signal (or additional data/information used to provision the user device to the network) the user device may be provisioned (e.g., authenticated, activated, authorized, registered, etc.) to the network. Provisioning the user device to the network may cause a signal to be sent to the computing device that causes the computing device to cease embedding the data stream with the activation signal (or additional data/information used to provision the user device to the network).

FIG. 13 shows a flowchart of a method 1300 for visible light communication (VLC). VLC may be used to assist a user and/or user device (e.g., a mobile device, a smart device, the mobile device 124, the user device 206, the user device 510, the user device 601, etc.) navigate an area, communicate information/data relating to the area and/or items/devices within the area, communicate content to the user device, and/or the like. The area may be any building, facility, and/or the like, such as the inside of a retail store, a mall, a business, and/or the like.

At 1310, a computing device (e.g., a server, a set-top box, the media device 120, the computing device 202, the computing device 502, the computing device 604, etc.) may determine location information for each display device (e.g., a light emitting diode (LED) display device, a television, a monitor, etc.) of a plurality of display devices. The computing device may determine the locations of the plurality of display devices based on information/data configured (e.g., a configuration file, etc.) with the computing device that details the locations of the plurality of display devices. The computing device may determine the locations of the plurality of display devices based on a received signal strength indicator (RSSI) localization technique. A RSSI localization technique may include the computing device measuring a signal strength received from each display device of the plurality of display devices and analyzing the respective received a signal strengths relative to a known location of the computing device. The computing device may determine the locations of the plurality of display devices based on latitude and longitude coordinates provided by a global positioning system (GPS) device. The computing device may determine the locations of the plurality of display devices based on any suitable method and/or technique. The computing device may store and/or communicate location information (and information associated with the location information) relating to each display device of the plurality of display devices.

The computing device may store and/or communicate information/data related to the area in which each display device of the plurality of display devices are located. The information/data related to the area in which each display device of the plurality of display devices are located may include a map of the area and/or location-based and/or related information such as a floor, a department, an area, and/or the like associated with each display device of the plurality of display devices. For instance, the computing device may store and/or communicate location information that details that a display device of the plurality of display devices is on a first floor of the area, that a display device of the plurality of display devices is near an exit door of the area, and/or that a display device of the plurality of display devices is near a food court in the area. The information/data related to the area may include information relating to the environment of the area, such as stores, restrooms and/or other facilities that may be in proximity to the each display device of the plurality of display devices. The information/data related to the area may include sales, incentives, events, and/or the like associated with one or more stores, facilities, and/or the like in the area.

At 1320, the computing device may embed location information into a respective data stream addressed to a respective VLC-enabled device in communication with each display device of the plurality of display devices. The computing device may embed information associated with the area into a respective data stream addressed to a respective VLC-enabled device in communication with each display device of the plurality of display devices. The computing device may embed all or portions of the information associated with the area into a respective data stream addressed to a respective VLC-enabled device in communication with each display device of the plurality of display devices. For instance, the computing device may only send a portion(s) of the information associated with the area to each display device of the plurality of display devices that is relevant to the respective display device (e.g., relevant based on a proximity to the display device).

The respective VLC-enabled device in communication with each display device of the plurality of display devices, based on the location information and/or information associated with the area, may determine one or more control signals. The one or more control signals may be and/or include instructions that control operation of a display device of the plurality of display devices in communication with the respective VLC-enabled device. The respective VLC-enabled device may correlate the one or more control signals to the respective location information and/or information associated with the area. The respective VLC-enabled device in communication with each display device of the plurality of display devices, may send the one or more control signals and the respective data streams to the respective display devices. The one or more control signals may cause the respective display devices to communicate the respective location information and/or information associated with the area while displaying the respective data stream.

To communicate the respective location information and/or information associated with the area while displaying the respective data stream, the one or more control signals received from the respective VLC-enabled devices may cause respective display devices to modify a respective luminance/output the display device (via respective light emitting diodes (LEDs) and/or any other component of the display device) to represent/communicate the respective location information and/or information associated with the area. The respective one or more control signals may cause the respective display device to generate/produce light signals that propagate within line-of-sight areas of the respective display device. The respective one or more control signals may cause the respective display device to generate/produce light signals that represent either a 1 (e.g., a logical 1, etc.) or a 0 (e.g., a logical 0, etc.), similar to the 1's and 0's used in binary computations and/or digital communications, that correspond to the respective location information and/or information associated with the area.

The user device may be configured with a visible light communication (VLC) receiver/detector that may receive the respective light signals as the user device enters the respective line-of-sight areas for each display device of the plurality of display devices. Because the user device is within a line-of-sight area, the user device may decode/interpret the light signals generated by a display device of the plurality of display devices to determine the respective location information and/or information associated with the area that is relative to and/or associated with the respective display device. For instance, if the display device is within a store, the user device may decode/interpret light signals to determine one or more sales, promotions, items, and or the like associated with the store. The user device may decode/interpret the light signals to determine that the user device is in a particular section of a store and/or that a different section is within a proximity to the location of the user device.

FIG. 14 shows a flowchart of a method 1400 for visible light communication (VLC). VLC may be used to track and/or determine consumption of content and/or content items. At 1410, a computing device (e.g., a server, a set-top box, the media device 120, the computing device 202, the computing device 502, the computing device 604, etc.) may determine tracking information/data for each content item of a plurality of content items. The plurality of content items may include a television show, a sporting event, a news show, a movie, a music video, an electronic program guide (EPG), an advertisement, and/or the like. The tracking information/data may include watermarks, metadata, timestamps, identifiers, and/or the like.

At 1420, the computing device may embed the tracking information/data into a data stream comprising one or more of the plurality of content items. The computing device may send the data stream to a VLC-enabled device (e.g., a device associated with VLC and/or configured to send data via VLC, etc.). The VLC-enabled device may use the tracking information embedded in the data stream to determine one or more control signals. The one or more control signals may be and/or include instructions that control operation of a display device, such as one or more components of the display device. The VLC-enabled device may correlate the one or more control signals to the tracking information/data. The VLC-enabled device may send the one or more control signals and the data stream to the display device. The one or more control signals may cause the display devices to communicate the tracking information/data while displaying the data stream.

To communicate the tracking information/data while displaying the data stream, the one or more control signals may cause the display device to modify a luminance/output of the display device (via light emitting diodes (LEDs) and/or any other component of the display device) to represent/communicate the tracking information/data. The one or more control signals may cause the display device to generate/produce light signals that represent either a 1 (e.g., a logical 1, etc.) or a 0 (e.g., a logical 0, etc.), similar to the 1's and 0's used in binary computations and/or digital communications, that correspond to the tracking information/data. The display device may generate/produce the light signals while displaying the data stream (or a portion of the data stream). The display device may generate/produce the light signals at a frequency that is imperceptible to a human eye, such as a frequency of 200 Hz or greater, while displaying the data stream.

A user device (e.g., a mobile device, a smart device, the mobile device 124, the user device 206, the user device 510, the user device 601, etc.) may be configured with a visible light communication (VLC) receiver/detector that may receive the light signals as the user device enters a line-of-sight of the display device. The user device may decode/interpret the light signals to determine the tracking information/data.

At 1430, the computing device may receive an indication of the tracking information/data and an identifier of the user device. The user device may decode/interpret the light signals, and the decoding/interpreting of the light signals may trigger and/or activate the tracking information/data to track consumption of the data stream by the user device.

At 1440, the computing device may determine, based on receiving the indication of the tracking information/data and the identifier of the user device, content consumption data. For example, the decoding/interpreting of the light signals by the user device may be tracked and/or recorded as consumption of the data stream. In some instances, the user device may send a notification (e.g., a short-range communication signal/message, a long-range communication signal/message, etc.) to the computing device (or any other device) to indicate that the user device is decoding/interpreting of the light signals. The notification sent by the user device may be used to track content consumption associated with the user device.

Figure 15:
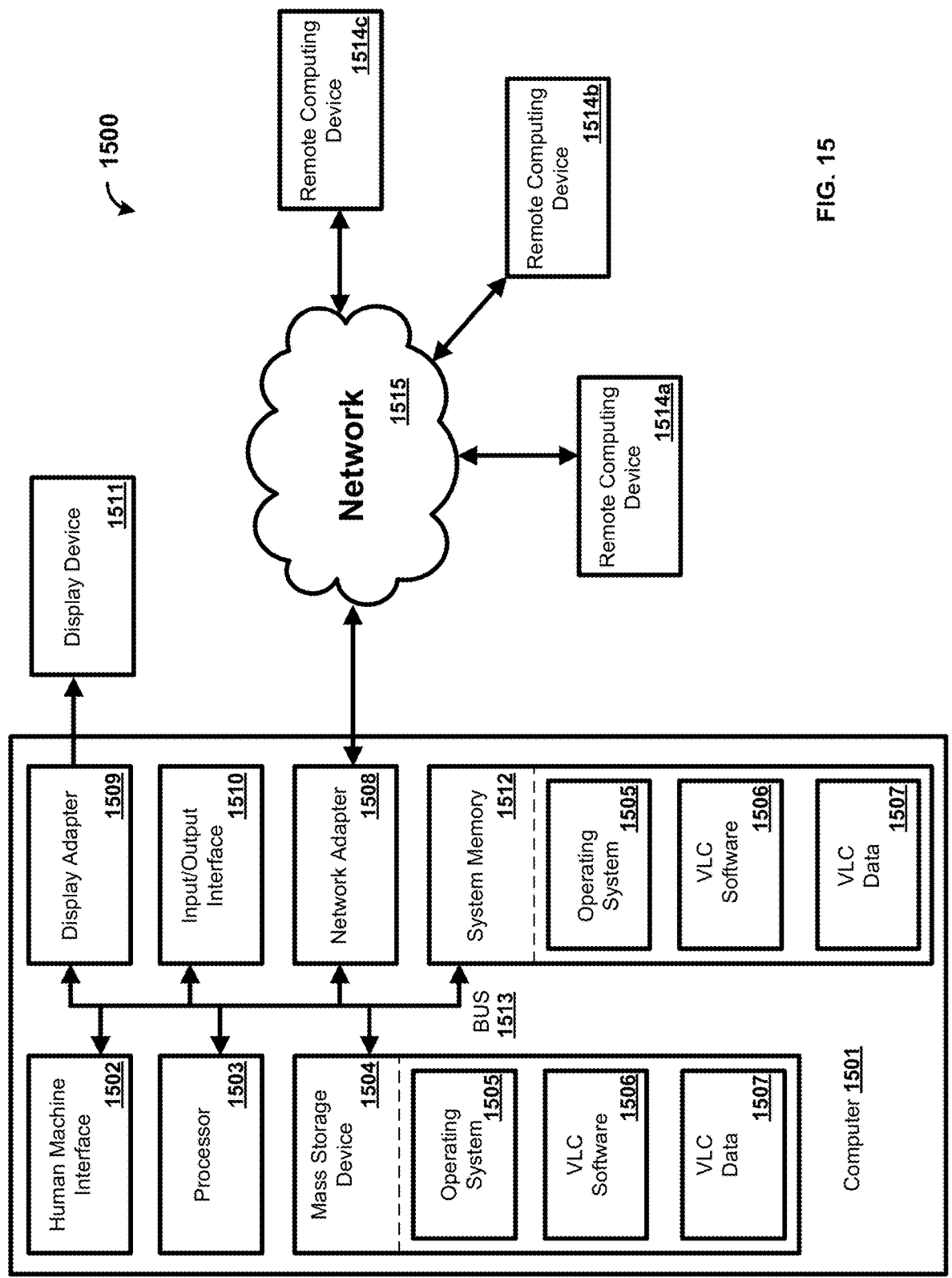
FIG. 15 shows a block diagram of an example computing device for implementing VLC communication.

FIG. 15 shows a system 1500 for visible light communication (VLC). Each device described herein may be a computer 1501 as shown in FIG. 15. Similarly, the methods and systems described may utilize one or more computers to perform one or more functions in one or more locations.

The computer 1501 may include one or more processors 1503, a system memory 1512, and a bus 1513 that couples various system components including the one or more processors 1503 to the system memory 1512. In the case of multiple processors 1503, the computer 1501 may utilize parallel computing.

The bus 1513 may be one or more of several possible types of bus structures, including a memory bus or memory controller, a peripheral bus, an accelerated graphics port, or local bus using any of a variety of bus architectures.

The computer 1501 may operate on and/or include a variety of computer readable media (e.g., non-transitory). The readable media may be any available media that may be accessible by the computer 1501 and may include both volatile and non-volatile media, removable and non-removable media. The system memory 1512 has computer readable media in the form of volatile memory, such as random access memory (RAM), and/or non-volatile memory, such as read only memory (ROM). The system memory 1512 may store data such as the VLC data 1507 and/or program modules such as the operating system 1505 and the VLC software 1506 that are accessible to and/or are operated on by the one or more processors 1503.

The computer 1501 may also include other removable/non-removable, volatile/non-volatile computer storage media. FIG. 15 shows the mass storage device 1504 which may provide non-volatile storage of computer code, computer readable instructions, data structures, program modules, and other data for the computer 1501. The mass storage device 1504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1504, such as the operating system 1505 and the VLC software 1506. Each of the operating system 1505 and the VLC software 1506 (or some combination thereof) may include elements of the program modules and the VLC software 1506. The VLC data 1507 may also be stored on the mass storage device 1504. The VLC data 1507 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1515.

A user may enter commands and information into the computer 1501 via an input device (not shown). Input devices may be, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1503 via a human machine interface 1502 that is coupled to the bus 1513, but may be connected by other interface and bus structures, such as a parallel port, game port, an IEEE 1394 Port (also known as a Firewire port), a serial port, network adapter 1508, and/or a universal serial bus (USB).

The display device 1511 may also be connected to the bus 1513 via an interface, such as the display adapter 1509. It is contemplated that the computer 1501 may have more than one display adapter 1509 and the computer 1501 may have more than one display device 1511. The display device 1511 may be a monitor, a LCD (Liquid Crystal Display), light emitting diode (LED) display, television, smart lens, smart glass, and/or a projector. In addition to the display device 1511, other output peripheral devices may be components such as speakers (not shown) and a printer (not shown) which may be connected to the computer 1501 via the Input/Output Interface 1510. Any step and/or result of the methods may be output (or caused to be output) in any form to an output device. Such output may be any form of visible representation, including, but not limited to, textual, graphical, animation, audio, tactile, and the like. The display device 1511 and computer 1501 may be part of one device, or separate devices.

The computer 1501 may operate in a networked environment using logical connections to one or more remote computing devices 1514*a, b, c*. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1501 and a remote computing device 1514*a, b, c* may be made via a network 1515, such as a local area network (LAN) and/or a general wide area network (WAN). Such network connections may be through the network adapter 1508. The network adapter 1508 may be implemented in both wired and wireless environments. Such networking environments are conventional and commonplace in dwellings, offices, enterprise-wide computer networks, intranets, and the Internet.

Application programs and other executable program components such as the operating system 1505 are shown herein as discrete blocks, although it is recognized that such programs and components reside at various times in different storage components of the computing device 1501, and are executed by the one or more processors 1503 of the computer. An implementation of the VLC software 1506 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    receiving, by a computing device, data;
    determining, based on an indicator that indicates that the data comprises visual light communication (VLC) data, that the data comprises data; and
    causing output of the VLC data.

2. The method of claim 1, wherein causing the output of the VLC data comprises sending, to a display device, the VLC data.

3. The method of claim 2 wherein the data further comprises first data and wherein the method further comprises causing, by the display device, output of the first data while simultaneously sending, via VLC, the VLC data to a second computing device.

4. The method of claim 1, wherein the data comprises one or more of video content, an electronic program guide, location information, or an advertisement, the method further comprising sending, to a display device, one or more of the video content, the electronic program guide, the location information, or the advertisement for display.

5. The method of claim 1, wherein the indicator comprises a VLC identifier that indicates that the VLC data is different than another portion of the data.

6. The method of claim 1, wherein causing the output of the VLC data comprises causing a light emitting diode (LED) of a display device to modify an output to send, via VLC, the VLC data.

7. The method of claim 1, further comprising determining that a user device is within proximity to a display device, wherein the data is received based on determining that the user device is within the proximity of the display device.

8. The method of claim 1, further comprising:
    determining, based on the VLC data, one or more control signals; and
    sending, to a display device, the one or more control signals that modify an output of the display device to send the VLC data to a second computing device.

9. A method comprising:
    determining that a user device is within proximity to a display device;
    receiving, based on determining that the user device is within the proximity, data;
    determining, based on an indicator that indicates that the data comprises a visual light communication (VLC), that the data comprises VLC data; and
    causing output of the VLC data.

10. The method of claim 9, wherein causing the output of the VLC data comprises sending, to the display device, the VLC data.

11. The method of claim 9, wherein the data further comprises first data and wherein the method further comprises causing, by the display device, output of the first data while simultaneously sending, via VLC, the VLC data to the user device.

12. The method of claim 9, wherein the data comprises one or more of video content, an electronic program guide, location information, or an advertisement, the method further comprising sending, to the display device, one or more of the video content, the electronic program guide, the location information, or the advertisement for display.

13. The method of claim 12, wherein the indicator comprises an identifier that indicates that the VLC data is different than one or more of the video content, the electronic program guide, the location information, or the advertisement.

14. The method of claim 9, wherein causing the output of the VLC data comprises causing a light emitting diode (LED) of the display device to modify an output to send, via VLC, the VLC data.

15. The method of claim 14, wherein causing the LED of the display device to modify the output comprises modifying luminance of the LED to represent one or more of a logical 1 or a logical 0.

16. An apparatus comprising:
    one or more processors; and
    a memory storing processor-executable instructions that, when executed by the one or more processors, cause the apparatus to:
        receive data;
        determine, based on an indicator that indicates that the data comprises visual light communication (VLC) data, that the data comprises data; and
        cause output of the VLC data.

17. The apparatus of claim 16, wherein the processor-executable instructions that, when executed by the one or more processors, cause the apparatus to cause the output of the VLC data, further cause the apparatus to:
    send, to a display device, the VLC data.

18. The apparatus of claim 16, wherein the processor-executable instructions that, when executed by the one or more processors, cause the output of the VLC data, further cause the apparatus to:
    cause a light emitting diode (LED) of a display device to modify an output to send, via VLC, the VLC data.

19. The apparatus of claim 16, wherein the data further comprises first data and wherein the processor-executable instructions that, when executed by the one or more processors, further cause the apparatus to:

cause output of the first data while simultaneously causing the apparatus to output the VLC data to a second computing device.

20. The apparatus of claim 16, wherein the indicator comprises a VLC identifier that indicates that the VLC data is different than another portion of the data.

21. The apparatus of claim 16, wherein the data comprises one or more of video content, an electronic program guide, location information, or an advertisement,
   wherein the processor-executable instructions that, when executed by the one or more processors, further cause the apparatus to:
      send, to a display device, one or more of the video content, the electronic program guide, the location information, or the advertisement for display.

22. The apparatus of claim 21, wherein the indicator comprises a VLC identifier that indicates that the VLC data is different than one or more of the video content, the electronic program guide, the location information, or the advertisement.

23. The apparatus of claim 16, wherein the processor-executable instructions that, when executed by the one or more processors, further cause the apparatus to:
   determine that a user device is within a proximity to a display device, wherein the data is received based on determining that the user device is within the proximity of the display device.

24. The apparatus of claim 16, wherein the processor-executable instructions that, when executed by the one or more processors, further cause the apparatus to:
   determine, based on the VLC data, one or more control signals; and
   send, to a display device, the one or more control signals that modify an output of the display device to send the VLC data to a second computing device.

* * * * *